(12) United States Patent
Axmon et al.

(10) Patent No.: US 11,777,696 B2
(45) Date of Patent: Oct. 3, 2023

(54) SERVING CELL ACTIVATION IN A WIRELESS COMMUNICATION SYSTEM

(71) Applicant: Telefonaktiebolaget LM Ericsson (publ), Stockholm (SE)

(72) Inventors: Joakim Axmon, Limhamn (SE); Muhammad Ali Kazmi, Sundbyberg (SE); Christopher Callender, Kinross (GB)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 119 days.

(21) Appl. No.: 17/254,908

(22) PCT Filed: Jun. 25, 2019

(86) PCT No.: PCT/SE2019/050614
§ 371 (c)(1),
(2) Date: Dec. 22, 2020

(87) PCT Pub. No.: WO2020/005144
PCT Pub. Date: Jan. 2, 2020

(65) Prior Publication Data
US 2021/0266134 A1    Aug. 26, 2021

Related U.S. Application Data

(60) Provisional application No. 62/689,589, filed on Jun. 25, 2018.

(51) Int. Cl.
*H04L 5/00* (2006.01)
*H04B 7/06* (2006.01)
*H04W 56/00* (2009.01)

(52) U.S. Cl.
CPC ......... *H04L 5/0098* (2013.01); *H04B 7/0617* (2013.01); *H04B 7/0695* (2013.01); *H04L 5/0092* (2013.01); *H04W 56/001* (2013.01)

(58) Field of Classification Search
None
See application file for complete search history.

(56) References Cited

U.S. PATENT DOCUMENTS

| 2011/0113137 A1* | 5/2011 | Ramachandran | H04B 7/063 709/224 |
| 2014/0140293 A1* | 5/2014 | Sharma | H04W 8/06 370/329 |

(Continued)

FOREIGN PATENT DOCUMENTS

WO    2017213223 A1    12/2017

OTHER PUBLICATIONS

Ericsson, "Further discussion on NR interruptions for NSA and SA", 3GPP TSG-RAN WG4 Meeting #87, R4-1806241, Busan, Korea, May 21-25, 2018, 1-4.

(Continued)

*Primary Examiner* — Alpus Hsu
*Assistant Examiner* — Camquyen Thai
(74) *Attorney, Agent, or Firm* — Christopher & Weisberg, P.A.

(57) ABSTRACT

A wireless device is configured to receive an activation command that commands the wireless device to activate a serving cell. The wireless device is configured to activate the serving cell within a maximum delay since receiving the activation command. The maximum delay depends on whether there is at least one other serving cell already activated for the wireless device in the same frequency band as that in which the serving cell is to be activated.

18 Claims, 22 Drawing Sheets

(56) References Cited

U.S. PATENT DOCUMENTS

| | | | |
|---|---|---|---|
| 2015/0189516 A1* | 7/2015 | Seo | H04W 48/10 370/329 |
| 2015/0257163 A1 | 9/2015 | Dalsgaard et al. | |
| 2015/0271806 A1 | 9/2015 | Kim et al. | |
| 2015/0319778 A1* | 11/2015 | Folke | H04W 48/20 370/330 |
| 2016/0073370 A1* | 3/2016 | Axmon | H04W 56/0015 370/350 |
| 2016/0302228 A1* | 10/2016 | Kazmi | H04W 74/004 |
| 2018/0160420 A1* | 6/2018 | Kim | H04W 72/048 |
| 2018/0206244 A1* | 7/2018 | Yang | H04W 72/005 |
| 2020/0274750 A1* | 8/2020 | Yi | H04J 11/0076 |
| 2020/0314665 A1* | 10/2020 | Cheng | H04W 72/085 |

OTHER PUBLICATIONS

Intel, "CR to TS38.133", 3GPP TSG-RAN4 Meeting #87, R4-1808533, Busan, Korea (Republic of), May 21-25, 2018, 1-2.

3GPP, "3rd Generation Partnership Project; Technical Specification Group Radio Access Network; NR; Medium Access Control (MAC) protocol specification (Release 15)", 3GPP TS 38.321 V15.2.0, Jun. 2018, pp. 1-73.

3GPP, "3GPP TS 38.133 V15.2.0", 3rd Generation Partnership Project; Technical Specification Group Radio Access Network; NR; Requirements for support of radio resource management (Release 15), Jun. 2018, 1-79.

3GPP, "3rd Generation Partnership Project; Technical Specification Group Radio Access Network; NR; Requirements for support of radio resource management (Release 15)", 3GPP TS 38.133 V15.0.0, Dec. 2017, 1-41.

Ericsson, "SCell activation for SCell in FR2", 3GPP TSG RAN WG4 Meeting #AH1807, R4-1808930, Montreal, Canada, Jul. 2-6, 2018, 1-3.

3GPP, "3GPP TS 38.101-2 V15.1.0 (Mar. 2018)", 3rd Generation Partnership Project; Technical Specification Group Radio Access Network; NR; User Equipment (UE) radio transmission and reception; Part 2: Range 2 Standalone (Release 15), Mar. 2018, 1-5.

Ericsson, "SCell activation delay for FR2", 3GPP TSG-RAN WG4 Meeting #AH1807; R4-1808931; Montreal, Canada, Jul. 2-6, 2018, 1-3.

Unknown, "Way forward on Scell activation delay", 3GPP TSG-RAN WG4 Meeting #86bis; R4-1805968; Melbourne, AU; Agenda Item: 7.9.10.3, Apr. 16-20, 2018, 1-4.

* cited by examiner

Table 5.2-1: NR operating bands in FR2

| NR Operating Band | Uplink (UL) operating band BS receive UE transmit $F_{UL\_low} - F_{UL\_high}$ | Downlink (DL) operating band BS transmit UE receive $F_{DL\_low} - F_{DL\_high}$ | Duplex Mode |
|---|---|---|---|
| n257 | 26500 MHz – 29500 MHz | 26500 MHz – 29500 MHz | TDD |
| n258 | 24250 MHz – 27500 MHz | 24250 MHz – 27500 MHz | TDD |
| n260 | 37000 MHz – 40000 MHz | 37000 MHz – 40000 MHz | TDD |

FIGURE 9A

| NR CA Band | NR Band (Table 5.2-1) |
|---|---|
| CA_n257B | n257 |
| CA_n257D | n257 |
| CA_n257E | n257 |
| CA_n257F | n257 |
| CA_n257G | n257 |
| CA_n257H | n257 |
| CA_n257I | n257 |
| CA_n257J | n257 |
| CA_n257K | n257 |
| CA_n257L | n257 |
| CA_n257M | n257 |

FIGURE 9B

| NR CA Band | NR Band (Table 5.2-1) |
|---|---|
| CA nX-nY | nX, nY |
| | |
| | |
| | |
| | |

*FIGURE 9C*

SERVING CELL ACTIVATION IN A WIRELESS COMMUNICATION SYSTEM

TECHNICAL FIELD

The present application relates generally to a wireless communication system, and relates more particularly to the activation of a serving cell in such a system.

BACKGROUND

A wireless device exploits multi-carrier operation to simultaneous transmit and/or receive data on multiple serving cells. Multi-carrier operation includes for instance carrier aggregation (CA) and dual connectivity (DC) as a special case of CA. These and other types of multi-carrier operation advantageously increase throughput, provide mobility robustness, and/or support load balancing.

Multi-carrier operation, however, proves complicated when the wireless device uses beamforming to receive in different spatial directions. When a wireless device activates a new serving cell, for example, the device can maximize performance for the new serving cell by performing a receive beam sweep in order to find the optimal receive beam on which to receive transmissions from that new serving cell. But this receive beam sweep threatens to undesirably prolong the time that the device takes to activate the new serving cell. And this extended activation delay in turn threatens to increase latency.

SUMMARY

According to some embodiments herein, a wireless device activates a serving cell within a maximum delay that depends on whether there is at least one other serving cell already activated for the device, e.g., in the same frequency band. For example, if there is at least one other serving cell already activated, the wireless device may activate the serving cell within a maximum delay that is shorter than if there is not at least one other serving cell already activated. Some embodiments shorten the maximum delay in this case on the basis that the device foregoes conducting a time-consuming receive beam sweep when there is at least one other serving cell already activated, in favor of reducing the time needed to activate the new serving cell. Indeed, under some circumstances, the receive beam sweep may jeopardize the performance of the already activated serving cell(s). For example, when the wireless device is only capable of using analog beamforming, such as may be the case for New Radio (NR) devices whose many antenna elements make digital beamforming impractical, the device has to use the same receive beam for serving cells in the same frequency band. This means that the device cannot switch to a different receive beam that a receive beam sweep reveals as more favorable to the new serving cell without jeopardizing the existing serving cell's performance. Especially in these circumstances, then, some embodiments prioritize performance of the already activated serving cells by forgoing the receive beam switch, which in turn expedites serving cell activation.

More particularly, embodiments herein include a method performed by a wireless device. The method includes receiving an activation command that commands the wireless device to activate a serving cell. The method also includes activating the serving cell within a maximum delay since receiving the activation command. In some embodiments, the maximum delay depends on whether there is at least one other serving cell already activated for the wireless device in the same frequency band as that in which the serving cell is to be activated.

In some embodiments, the method further comprises, after receiving the activation command, determining whether there is at least one other serving cell already activated for the wireless device in the same frequency band as that in which the serving cell is to be activated. The method may also comprise selecting, based on whether there is at least one other serving cell already activated for the wireless device in the same frequency band as that in which the serving cell is to be activated, one of multiple different activation procedures for activating the serving cell. At least some of the multiple different activation procedures incur different delays in cell activation. In one embodiment, for example, this selection is further based on whether or not the wireless device has to use the same receive beam to receive simultaneously from the serving cell and another serving cell activated for the wireless device in the same frequency band as that in which the serving cell is to be activated. Alternatively or additionally, in at least one of the multiple activation procedures, the wireless device refrains from conducting a receive beam sweep to determine a receive beam on which to receive from the serving cell to be activated.

In some embodiments where there is at least one other serving cell already activated for the wireless device in the same frequency band as that in which the serving cell is to be activated, activating the serving cell may comprise refraining from conducting a receive beam sweep to determine a receive beam on which to receive from the serving cell to be activated.

In some embodiments, after said activation, the method may further comprise receiving signals from the serving cell and the at least one other serving cell simultaneously using the same antenna array and/or receive beam at the wireless device. This may be the case for instance where there is at least one other serving cell already activated for the wireless device in the same frequency band as that in which the serving cell is to be activated.

In some embodiments, in order to simultaneously receive signals from the serving cell and any serving cell in the same frequency band, the wireless device is restricted to using the same antenna array and/or receive beam at the wireless device.

In some embodiments, the maximum delay depends on whether there is already at least one other activated serving cell on an intra-band component carrier relative to the serving cell to be activated.

In some embodiments, the maximum delay is relatively shorter or longer depending respectively on whether or not there is at least one other serving cell already activated for the wireless device in the same frequency band as that in which the serving cell is to be activated.

In some embodiments, the same frequency band comprises: (i) one of multiple New Radio, NR, operating bands included in an NR frequency range; (ii) a sub-band of one of the multiple NR operating bands; or (iii) one of multiple intra-band contiguous carrier aggregation operating bands.

In some embodiments, the maximum delay also depends on whether the serving cell to be activated is known or unknown to the wireless device.

In some embodiments, after activating the serving cell, the method comprises one or more of: receiving a synchronization signal block for the serving cell; performing automatic gain control or gain setting for the serving cell; detecting a transmit beam to use for the serving cell;

performing channel state information measurement and/or reporting for the serving cell; transmitting a sounding reference signal for the serving cell; monitoring a control channel on or for the serving cell; starting a serving cell deactivation timer for the serving cell; or triggering a power headroom report for the serving cell.

In some embodiments, the serving cell is a secondary cell, SCell, and the at least one other serving cell is a primary cell, PCell, a primary secondary cell, PSCell, or a secondary cell, SCell.

Embodiments herein also include corresponding apparatus, computer programs, and carriers. For example, embodiments herein include a wireless device. The wireless device is configured (e.g., via communication circuitry and processing circuitry) to receive an activation command that commands the wireless device to activate a serving cell. The wireless device is configured to activate the serving cell within a maximum delay since receiving the activation command. The maximum delay depends on whether there is at least one other serving cell already activated for the wireless device in the same frequency band as that in which the serving cell is to be activated.

BRIEF DESCRIPTION OF THE DRAWINGS

FIG. 9A is a table defining operating bands within which NR is designed to operate within FR2.

FIG. 9B is a table that shows the operating bands within which NR intra-band contiguous carrier aggregation is designed to operate.

FIG. 9C is a table that shows the operating bands within which NR inter-band carrier aggregation is designed to operate.

DETAILED DESCRIPTION

Figure 1:
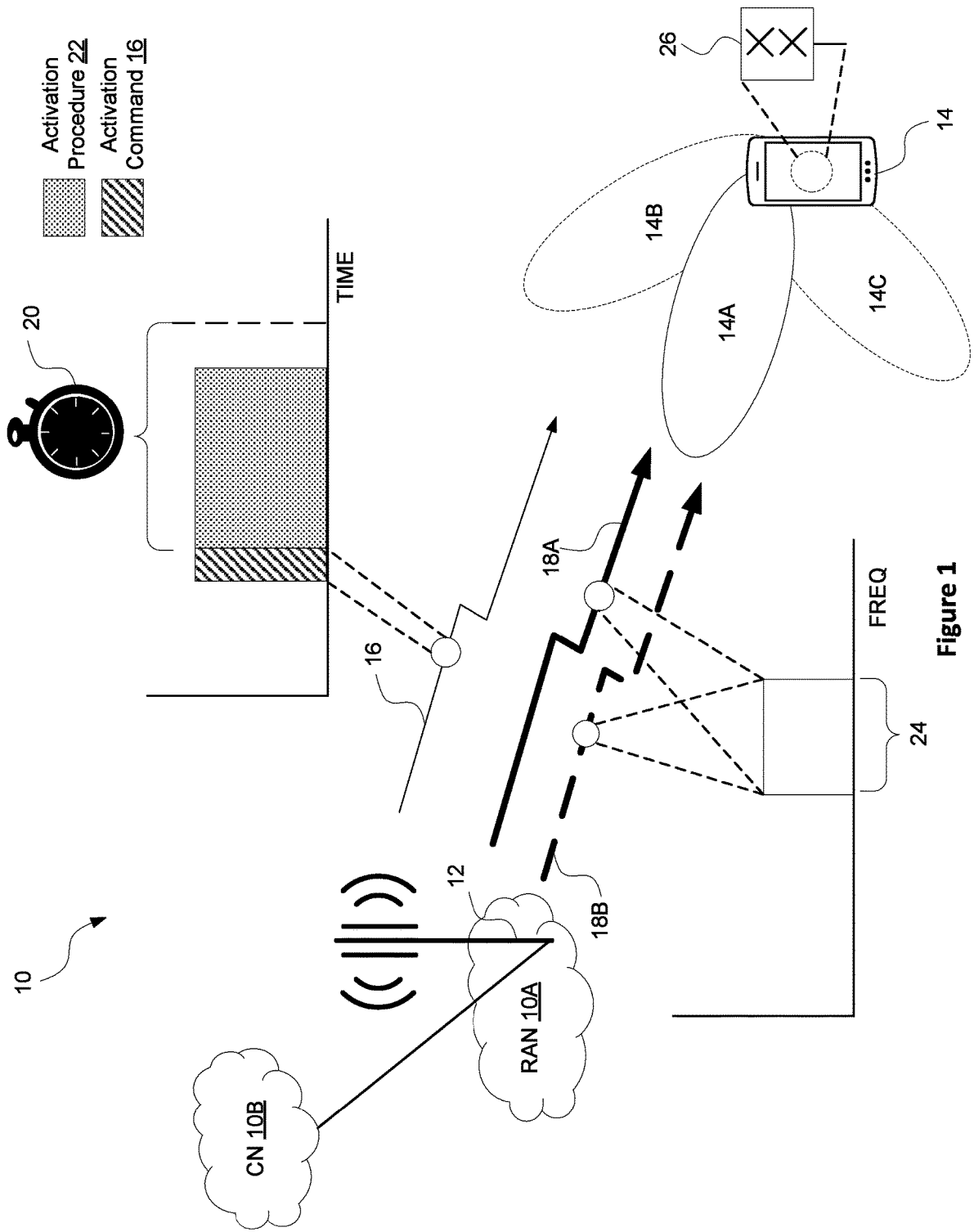
FIG. 1 is a block diagram of a wireless communication system according to some embodiments.

FIG. 1 shows a wireless communication system 10 (e.g., a New Radio, NR, system) according to some embodiments. The system 10 includes a radio access network (RAN) 10A and a core network (CN) 10B. A wireless device 14 wirelessly communicates with the RAN 10A (e.g., via one or more radio network nodes 12) in order to connect via the RAN 10A to the CN 10B. The CN 10B in turn connects the wireless device 14 to one or more data networks (not shown) such as the Internet.

In some embodiments, the wireless device 14 is capable of receive beamforming. As shown, for example, the wireless device 14 is equipped with at least one antenna array 26 with antenna elements that are controllable for realizing multiple receive beams 14A, 14B, and 14C on which to receive in different spatial directions. In some embodiments, the wireless device 14 is able to perform a so-called receive beam sweep in order to determine on which receive beam (i.e., in which spatial direction) to receive. Such sweep may involve for instance performing measurements on each of multiple receive beams that are candidates and selecting the receive beam whose measurements suggest the receive beam would provide the best performance. In one or more embodiments, though, such as when the wireless device 14 is an NR device with many antenna elements and/or has one receive chain per group of multiple antenna elements, the wireless device 14 is only capable of performing analog receive beamforming (or hybrid beamforming which requires that any digital beamforming be complemented with analog beamforming).

Alternatively or additionally, the wireless device 14 in some embodiments is capable of multi-carrier operation in which the wireless device 14 simultaneously transmits and/or receives data on multiple serving cells. The wireless device 14 may for instance be capable of multi-carrier operation in the form of carrier aggregation (CA) and/or multi-connectivity such as dual connectivity (DC). Regardless, in some embodiments such as when the wireless device 14 is only capable of analog beamforming and/or hybrid beamforming, the wireless device 14 notably can only receive signals from multiple serving cells simultaneously in the same frequency band if the wireless device 14 does so using the same antenna array and/or receive beam. That is, in order to simultaneously receive signals from multiple serving cells in the same frequency band, the wireless device 14 may be restricted to using the same antenna array and/or receive beam at the wireless device 14.

In these and other contexts, serving cells in the system 10 may each have a so-called activated status or de-activated status with respect to the wireless device 14. Serving cells in this regard may be activated and deactivated on an individual, serving cell by serving cell basis. Whether a serving cell is activated or deactivated with respect to the wireless device 14 may be controlled by the RAN 10A, for example, i.e., the RAN 10A instructs the wireless device 14 when to activate or deactivate any given serving cell. When a serving cell is activated, the wireless device 14 may transmit a sounding reference signal (SRS) on the serving cell, perform channel state information (CSI) measurement and/or reporting for the serving cell, and/or monitor a control channel on or for the serving cell. Alternatively or additionally, the wireless device 14 may receive a synchronization signal block for an activated serving cell, perform automatic gain control or gain setting for an activated serving cell, detect a transmit beam to use for an activated serving cell, start a serving cell deactivation timer for an activated serving cell, and/or trigger a power headroom report for an activated serving cell. Conversely, the wireless device 14 may refrain from such activities or functions for a serving cell that is deactivated.

In some embodiments, a serving cell may be configured on a semi-static basis (e.g., using radio resource control, RRC) but may be activated and de-activated on a more dynamic basis (e.g., via Medium Access Control, MAC, control elements, CEs). Such dynamic activation or de-activation may be based on cell load, channel conditions, end-user throughput requirement, etc.

In any event, the wireless device 14 as shown receives an activation command 16 that commands the wireless device 14 to activate a serving cell 18B, e.g., a secondary cell (SCell) in multi-carrier operation. The activation command 16 may for example be conveyed via dynamic signaling, such as via a Downlink Control Information (DCI) message, a MAC CE, or the like.

Regardless, the serving cell 18B is to be activated in a frequency band 24. The frequency band 24 in this regard may be a frequency range in which a radio access technology (RAT) used by the serving cell 18B is allowed to operate (e.g., FR1 or FR2 in which NR is allowed to operate). A frequency band 24 may alternatively refer to one of multiple possible operating bands in such a frequency range (e.g., one of multiple possible NR operating bands in an NR frequency range, such as one or more of "n257", "n258", "n260", "n261" in FR2, etc.). Here, the multiple possible operating bands constitute the operating bands in which the serving cell 18B is allowed to operate within the frequency range. In still other embodiments, the frequency band 24 may be a sub-band of such an operating band (e.g., "CA_n257B", "CA_n257D", "CA_257(2A)", "CA_257(3A)", etc.). In yet other embodiments, the frequency range may be one of multiple possible intra-band contiguous carrier aggregation operating bands, a range of frequencies deduced from the device's architecture, or from reported device radio frequency (RF) capabilities.

Having received the activation command 16, the wireless device 14 must activate the serving cell 18B within a maximum delay 20 since receiving the activation command 16. This may mean for instance that the wireless device 14 must complete an activation procedure 22 within the maximum delay 20. The maximum delay 20 may also be referred to as Tactivation_time or as a delay that is a function of Tactivation_time.

According to some embodiments, the maximum delay 20 (or more specifically, the duration or length of the maximum delay) notably depends on whether there is at least one other serving cell 18A (e.g., PCell, PSCell, or SCell) already activated for the wireless device 14 in the same frequency band 24 as that in which the serving cell 18B is to be activated. FIG. 1 for example shows this as being the case, i.e., serving cell 18A is already activated in the same frequency band 24. According to some embodiments, if there is at least one other serving cell 18A already activated for the wireless device 14 in the same frequency band 24, the maximum delay 20 has a lower value than if it was not the case that at least one other serving cell 18A was already activated for the wireless device 14 in the same frequency band 24. That is, the maximum delay 20 is relatively shorter or longer depending respectively on whether or not there is at least one other serving cell 18A already activated for the wireless device 14 in the same frequency band 24 as that in which the serving cell 18B is to be activated. Shortening the maximum delay 20 advantageously expedites the time within which the wireless device 14 activates the serving cell 18B and thereby reduces latency.

With the maximum delay 20 dependent on whether there is at least one other serving cell 18A already activated for the wireless device 14 in the same frequency band 24 as that in which the serving cell 18B is to be activated, the activation procedure 22 that the wireless device 14 performs for activating the cell may correspondingly be dependent on whether there is at least one other serving cell 18A already activated in the same frequency band 24. In some embodiments, for example, after receiving the activation command 16, the wireless device 14 determines whether there is at least one other serving cell 18A already activated for the wireless device 14 in the same frequency band 24 as that in which the serving cell 18B is to be activated. The wireless device 14 then selects, based on that determination, one of multiple different activation procedures with which to activate the serving cell 18B. At least some of these procedures may incur different delays in cell activation. The wireless device 14 may accordingly select one of the activation procedures that incurs a delay that is less than or equal to the maximum delay 20 allowed given whether there is at least one other serving cell 18A already activated for the wireless device 14 in the same frequency band 24. This way, the wireless device 14 may activate the serving cell 18B within the maximum delay 20 allowed, even if the maximum delay 20 is shortened.

Some embodiments shorten the maximum delay 20, and thereby reduce the time for activating the new serving cell 18B, on the basis that the wireless device 14 foregoes conducting a receive beam sweep when there is at least one other serving cell already activated in the same frequency band 24. That is, according to some embodiments, even though the wireless device 14 is capable of performing a receive beam sweep to determine the optimal receive beam on which to receive from the new serving cell 18B to be activated, the wireless device 14 refrains from conducting such a receive beam sweep if there is at least one other serving cell 18A already activated in the same frequency band 24. Accordingly, in embodiments where the wireless device 14 selects from among multiple different activation procedures for activating the serving cell 18B, the wireless device 14 selects an activation procedure in which the wireless device 14 refrains from conducting a receive beam sweep to determine a receive beam on which to receive from the serving cell 18B.

Forgoing such a receive beam sweep saves the wireless device 14 time in activating the serving cell 18B. Moreover, in some embodiments, forgoing the receive beam sweep avoids jeopardizing the performance of the already activated serving cell(s) 18A. This may be the case for example in embodiments where the wireless device 14 is only capable of analog beamforming and/or hybrid beamforming, and/or is otherwise required to use the same antenna array and/or receive beam to receive signals from multiple serving cells simultaneously in the same frequency band. Indeed, this means that the device 14 cannot switch to a different receive beam that the receive beam sweep might reveal as more favorable to the new serving cell 18B without jeopardizing the existing serving cell's performance. Accordingly, as shown in FIG. 1, for instance, the wireless device 14 may refrain from performing a beam sweep to determine which of beams 14A-14C to use for the serving cell 18B to be activated, based on the fact that the wireless device 14 must use beam 14A since it is already using beam 14A for cell 18A. Especially in these circumstances, then, some embodiments prioritize performance of the already activated serving cell(s) 18A over the newly activated serving cell 18B, by forgoing the receive beam switch, which in turn expedites activation of the new serving cell 18B.

In some embodiments, then, the maximum delay 20 may also be dependent on whether the wireless device 14 is only capable of analog beamforming and/or hybrid beamforming, and/or is otherwise required to use the same antenna array and/or receive beam to receive signals from multiple serving cells simultaneously in the same frequency band. For example, if the wireless device 14 is capable of digital beamforming or otherwise able to use different antenna arrays and/or receive beams to receive signals from multiple serving cells simultaneously in the same frequency band, the maximum delay 20 may be defined as long enough to permit a receive beam sweep, even if the serving cell 18B to be activated is in the same frequency band as an already activated serving cell 18A. But if the wireless device 14 is only capable of analog beamforming and/or hybrid beamforming, and/or is otherwise required to use the same antenna array and/or receive beam to receive signals from multiple serving cells simultaneously in the same frequency band, the maximum delay 20 may be defined as shorter so as to prohibit a receive beam sweep if the serving cell 18B to be activated is in the same frequency band as an already activated serving cell 18A. Accordingly, the shorter maximum delay in some embodiments may be explicitly or inherently based upon the wireless device 14 not needing to perform (or choosing not to perform) a receive beam sweep as part of activating the serving cell 18B.

Alternatively or additionally in this regard, the wireless device 14 may determine whether or not to perform a receive beam sweep in the activation procedure 22 for activating the serving cell 18B, based on whether or not there is already another activated serving cell 18A for the wireless device 14 and whether or not the wireless device 14 is restricted to using the same receive beam 14A to receive simultaneously from the serving cell 18B and the other activated serving cell 18A.

Figure 2:
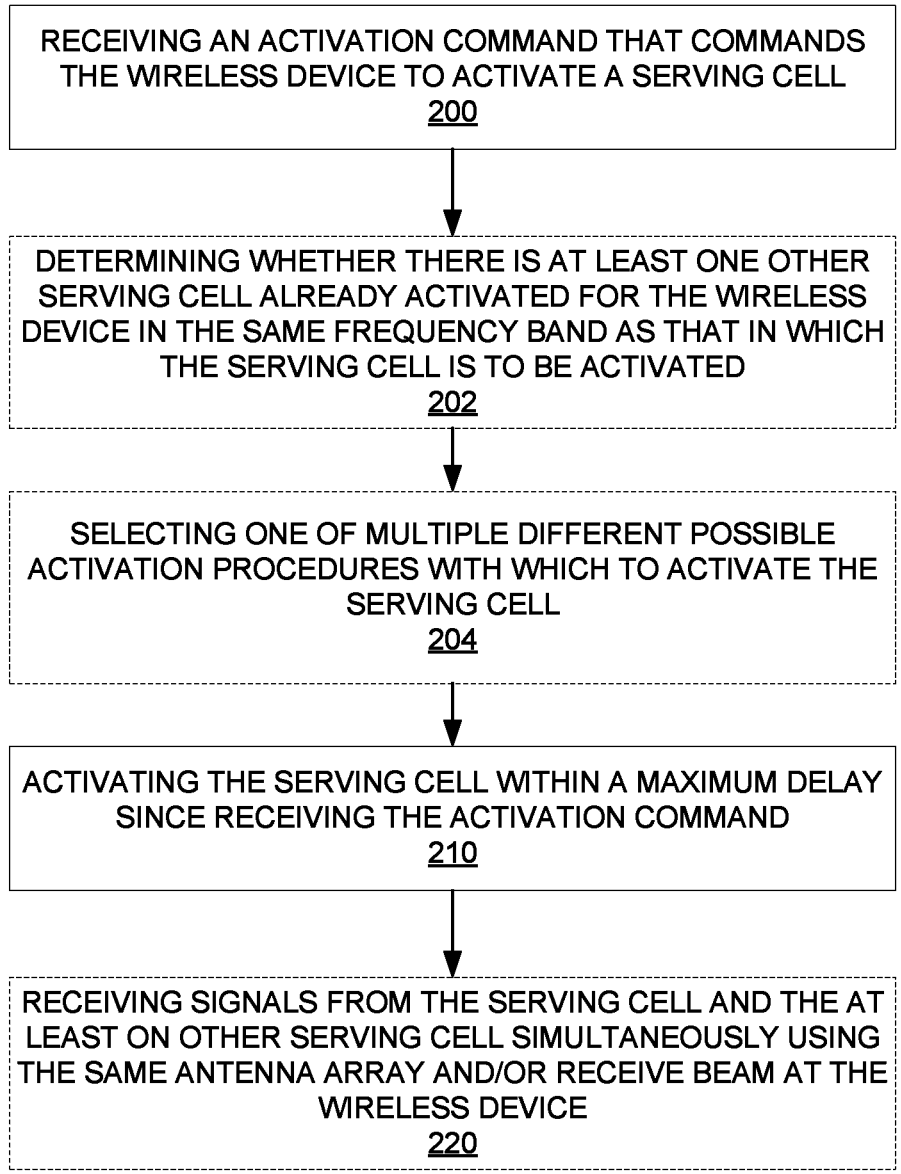
FIG. 2 is a logic flow diagram of a method performed by a wireless device according to some embodiments.

In view of the modifications and variations herein, FIG. 2 depicts a method performed by a wireless device 14 in accordance with particular embodiments. The method includes receiving an activation command 16 that commands the wireless device 14 to activate a serving cell 18B (Block 200). The method also includes activating the serving cell 18B within a maximum delay 20 since receiving the activation command 16 (Block 210). In some embodiments, the maximum delay 20 depends on whether there is at least one other serving cell 18A already activated for the wireless device 14 in the same frequency band 24 (e.g., the same NR operating band in FR2) as that in which the serving cell 18B is to be activated. Regardless, in some embodiments, such activation may comprise refraining from conducting a receive beam sweep to determine a receive beam on which to receive from the serving cell 18B to be activated. Such refraining may be performed for instance if there is at least one other serving cell 18A already activated for the wireless device 14 in the same frequency band 24 as that in which the serving cell 18B is to be activated.

In one or more embodiments, the method further comprises determining whether there is at least one other serving cell 18A already activated for the wireless device 14 in the same frequency band 24 as that in which the serving cell 18A is to be activated (Block 202). The method may include selecting one of multiple different possible activation procedures with which to activate the serving cell (Block 204). This selection may be based on whether there is at least one other serving cell 18A already activated for the wireless device 14 in the same frequency band 24 as that in which the serving cell 18B is to be activated. In some embodiments, at least some of the multiple different possible procedures incur different delays in cell activation. Alternatively or additionally, in at least one of the multiple possible activation procedures, the wireless device 14 refrains from conducting a receive beam sweep to determine a receive beam on which to receive from the serving cell 18B to be activated.

In some embodiments, the method may also include receiving signals from the serving cell 18B and the at least on other serving cell 18A simultaneously using the same antenna array and/or receive beam at the wireless device 14. This may be the case for instance if there is at least one other serving cell 18A already activated for the wireless device 14 in the same frequency band 24 as that in which the serving cell 18B is to be activated.

In these and other embodiments, then, the wireless device 14 may be restricted to receiving signals simultaneously from the serving cell 18B and any serving cell 18A in the same frequency band 24 using the same antenna array and/or receive beam at the wireless device 14. In fact, in some embodiments, the wireless device 14 comprises an antenna array and comprises one receiver chain per group of multiple antenna elements in the antenna array. In this case, the method may further comprise performing analog beamforming and/or hybrid beamforming.

Note that in at least some embodiments activating the serving cell 18B may comprise one or more of: receiving a synchronization signal block for the serving cell; performing automatic gain control or gain setting for the serving cell; detecting a transmit beam to use for the serving cell; performing channel state information measurement and/or reporting for the serving cell; transmitting a sounding reference signal for the serving cell; monitoring a control channel on or for the serving cell; starting a serving cell deactivation timer for the serving cell; or triggering a power headroom report for the serving cell.

In any of these embodiments, the serving cell 18B may be a secondary cell, SCell, and/or the at least one other serving cell may be a primary cell, PCell, a primary secondary cell, PSCell, or a secondary cell, SCell.

In some embodiments, the maximum delay depends on whether there is already at least one other activated serving cell on an intra-band component carrier relative to the serving cell to be activated.

In some embodiments, the frequency band 24 comprises one of multiple possible New Radio, NR, operating bands included in an NR frequency range. In one such embodiment, the maximum delay depends on whether there is at least one other serving cell already activated for the wireless device in the same NR operating band as that in which the serving cell is to be activated.

In some embodiments, the frequency band comprises a frequency sub-band.

In some embodiments, the frequency band comprises one of multiple possible intra-band contiguous carrier aggregation operating bands included in a New Radio, NR, operating frequency band.

In some embodiments, the frequency band includes at least some frequencies in a millimeter frequency band.

In some embodiments, the maximum delay also depends on whether the serving cell to be activated is known or unknown to the wireless device.

Figure 3:
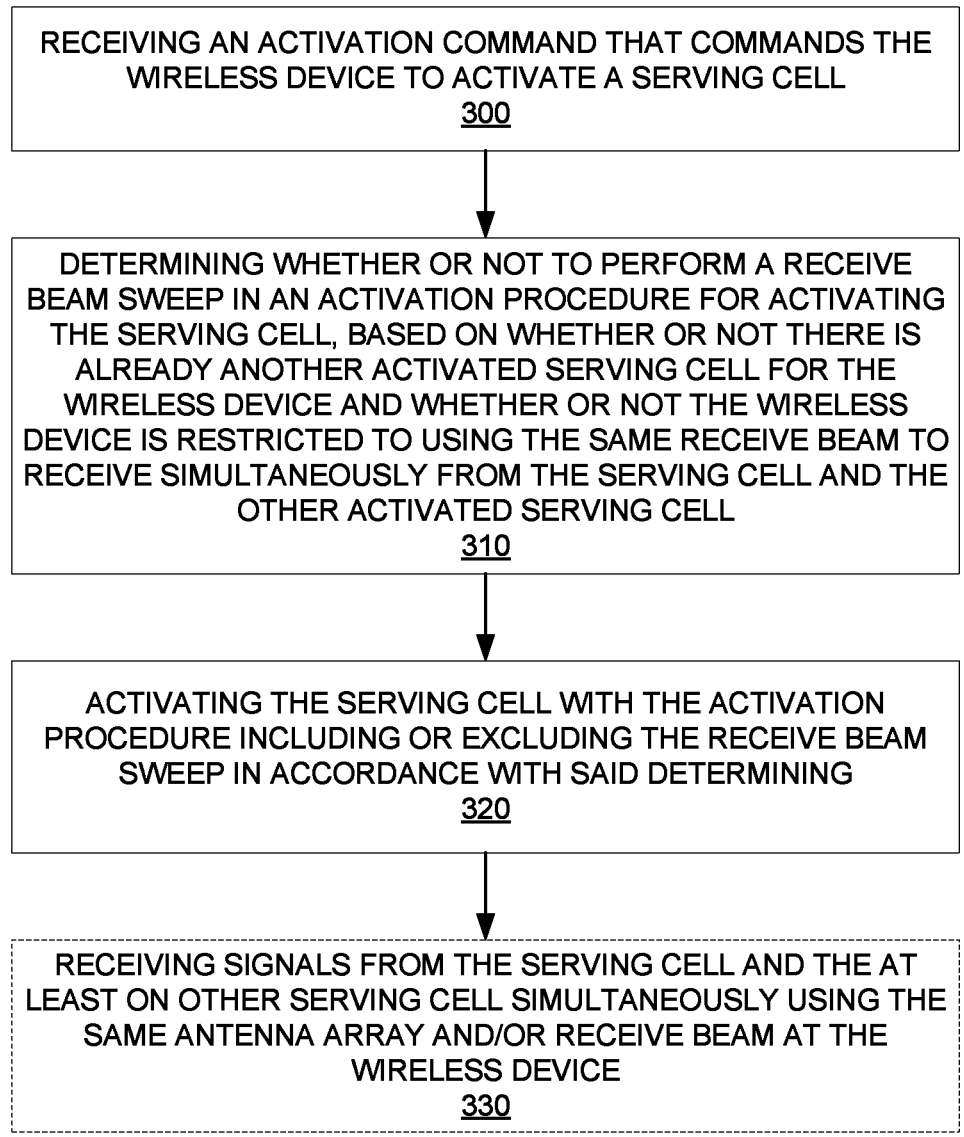
FIG. 3 is a logic flow diagram of a method performed by a wireless device according to other embodiments.

FIG. 3 depicts a method performed by a wireless device 14 in accordance with other particular embodiments. The method includes receiving an activation command 16 that commands the wireless device 14 to activate a serving cell 18B (Block 300). The method also includes determining whether or not to perform a receive beam sweep in an activation procedure 22 for activating the serving cell 18B (Block 310). This determination may be based on whether or not there is already another activated serving cell 18A for the wireless device 14 and whether or not the wireless device 14 is restricted to using the same receive beam to receive simultaneously from the serving cell 18B and the other activated serving cell 18A. In some embodiments, for example, the wireless device 14 may determine to not perform the receive beam sweep in the activation procedure 22 when there is already another activated serving cell for the wireless device 14 and the wireless device 14 is restricted to using the same receive beam to receive simultaneously from the serving cell 18B and the other activated serving cell 18A. Alternatively or additionally, in some embodiments where the wireless device 14 is restricted to using the same receive beam to receive simultaneously from the serving cell 18B and any other activated serving cell 18A that belongs to the same frequency band (e.g., NR operating band in FR2) as the serving cell 18B, the wireless device 14 may determine to not perform the receive beam sweep in the activation procedure when there is already another activated serving cell 18A for the wireless device 14 and the serving cell 18B and the another activated serving cell 18A belong to the same frequency band 24. Regardless, the method also includes activating the serving cell 18B with the activation procedure including or excluding the receive beam sweep in accordance with said determining (Block 320).

In some embodiments, the method further includes receiving signals from the serving cell 18B and the at least on other serving cell 18A simultaneously using the same antenna array and/or receive beam at the wireless device 14 (Block 330). This may be the case for instance if there is at least one other serving cell 18A already activated for the wireless device 14 in the same frequency band 24 as that in which the serving cell 18B is to be activated.

In these and other embodiments, then, the wireless device may be restricted to receiving signals simultaneously from the serving cell 18B and any serving cell 18A in the same frequency band 24 using the same antenna array and/or receive beam at the wireless device 14. In fact, in some embodiments, the wireless device 14 comprises an antenna array 26 and comprises one receiver chain per group of multiple antenna elements in the antenna array 26. In this case, the method may further comprise performing analog beamforming and/or hybrid beamforming.

Note that in at least some embodiments activating the serving cell may comprise one or more of: receiving a synchronization signal block for the serving cell; performing automatic gain control or gain setting for the serving cell; detecting a transmit beam to use for the serving cell; performing channel state information measurement and/or reporting for the serving cell; transmitting a sounding reference signal for the serving cell; monitoring a control channel on or for the serving cell; starting a serving cell deactivation timer for the serving cell; or triggering a power headroom report for the serving cell.

In any of these embodiments, the serving cell may be a secondary cell, SCell, and/or the at least one other serving cell may be a primary cell, PCell, a primary secondary cell, PSCell, or a secondary cell, SCell.

In some embodiments, the maximum delay depends on whether there is already at least one other activated serving cell on an intra-band component carrier relative to the serving cell to be activated.

In some embodiments, the frequency band 24 comprises one of multiple possible New Radio, NR, operating bands included in an NR frequency range. In one such embodiment, the maximum delay depends on whether there is at least one other serving cell already activated for the wireless device in the same NR operating band as that in which the serving cell is to be activated.

In some embodiments, the frequency band comprises a frequency sub-band.

In some embodiments, the frequency band comprises one of multiple possible intra-band contiguous carrier aggregation operating bands included in a New Radio, NR, operating frequency band.

In some embodiments, the frequency band includes at least some frequencies in a millimeter frequency band.

In some embodiments, the maximum delay also depends on whether the serving cell to be activated is known or unknown to the wireless device.

Figure 4:
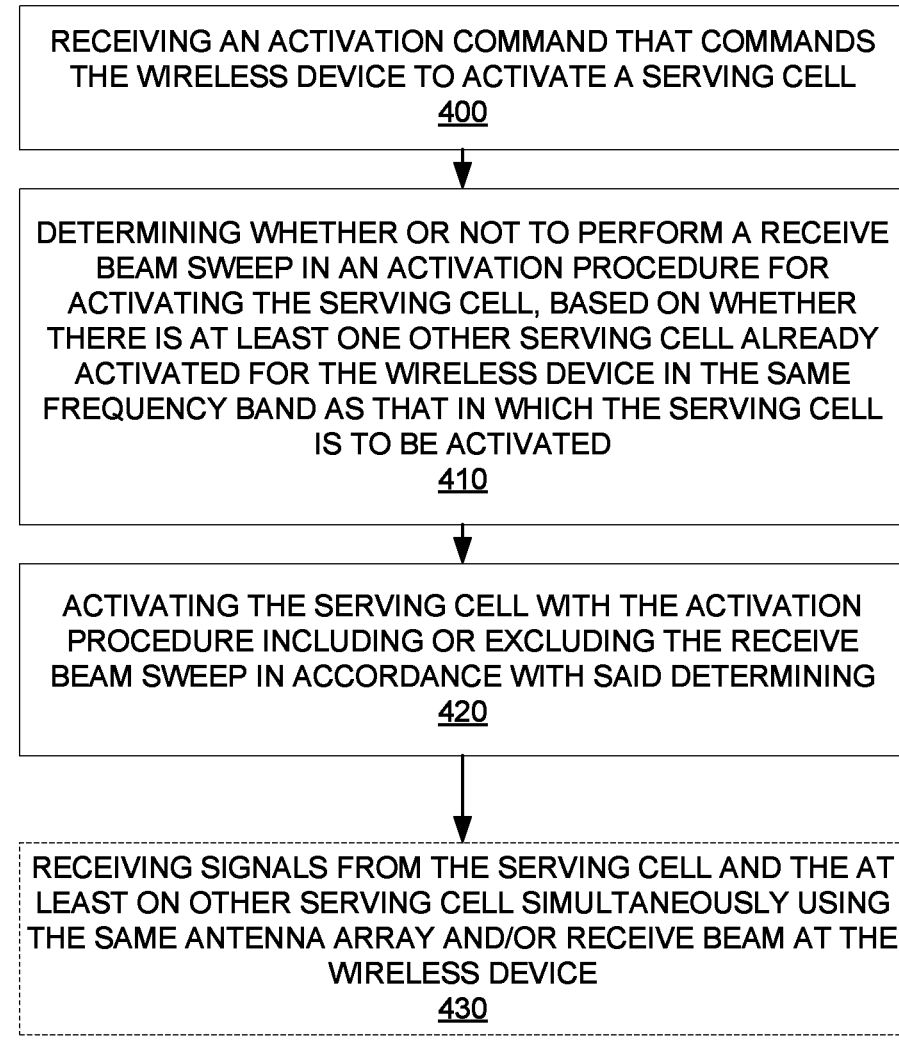
FIG. 4 is a logic flow diagram of a method performed by a wireless device according to yet other embodiments.

FIG. 4 depicts a method performed by a wireless device 14 in accordance with other particular embodiments. The method includes receiving an activation command 16 that commands the wireless device 14 to activate a serving cell 18B (Block 400). The method also includes determining whether or not to perform a receive beam sweep in an activation procedure 22 for activating the serving cell 18B (Block 410). This determination may be based on whether there is at least one other serving cell 18A already activated for the wireless device 14 in the same frequency band 24 (e.g., NR operating band in FR2) as that in which the serving cell 18B is to be activated. In some embodiments where there is at least one other serving cell 18A already activated for the wireless device 14 in the same frequency band 24 as that in which the serving cell 18A is to be activated, the wireless device 14 may activate the serving cell 18B with the activation procedure 22 excluding the receive beam sweep to receive simultaneously from the serving cell 18B and the other activated serving cell 18A. Regardless, the method also includes activating the serving cell 18B with the activation procedure 22 including or excluding the receive beam sweep in accordance with said determining (Block 420).

In some embodiments, the method further includes receiving signals from the serving cell 18B and the at least on other serving cell 18A simultaneously using the same antenna array and/or receive beam at the wireless device 14 (Block 430). This may be the case for instance if there is at least one other serving cell 18A already activated for the wireless device 14 in the same frequency band 24 as that in which the serving cell 18B is to be activated.

In these and other embodiments, then, the wireless device 14 may be restricted to receiving signals simultaneously from the serving cell 18B and any serving cell 18A in the same frequency band 24 using the same antenna array and/or receive beam at the wireless device 14. In fact, in some embodiments, the wireless device 14 comprises an antenna array 26 and comprises one receiver chain per group of multiple antenna elements in the antenna array. In this case, the method may further comprise performing analog beamforming and/or hybrid beamforming.

Note that in at least some embodiments activating the serving cell 18B may comprise one or more of: receiving a synchronization signal block for the serving cell; performing automatic gain control or gain setting for the serving cell; detecting a transmit beam to use for the serving cell; performing channel state information measurement and/or reporting for the serving cell; transmitting a sounding reference signal for the serving cell; monitoring a control channel on or for the serving cell; starting a serving cell deactivation timer for the serving cell; or triggering a power headroom report for the serving cell.

In any of these embodiments, the serving cell 18B may be a secondary cell, SCell, and/or the at least one other serving cell may be a primary cell, PCell, a primary secondary cell, PSCell, or a secondary cell, SCell.

In some embodiments, the maximum delay 20 depends on whether there is already at least one other activated serving cell on an intra-band component carrier relative to the serving cell to be activated.

In some embodiments, the frequency band 24 comprises one of multiple possible New Radio, NR, operating bands included in an NR frequency range. In one such embodiment, the maximum delay depends on whether there is at least one other serving cell already activated for the wireless device in the same NR operating band as that in which the serving cell is to be activated.

In some embodiments, the frequency band comprises a frequency sub-band.

In some embodiments, the frequency band comprises one of multiple possible intra-band contiguous carrier aggregation operating bands included in a New Radio, NR, operating frequency band.

In some embodiments, the frequency band includes at least some frequencies in a millimeter frequency band.

In some embodiments, the maximum delay also depends on whether the serving cell to be activated is known or unknown to the wireless device.

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 5:
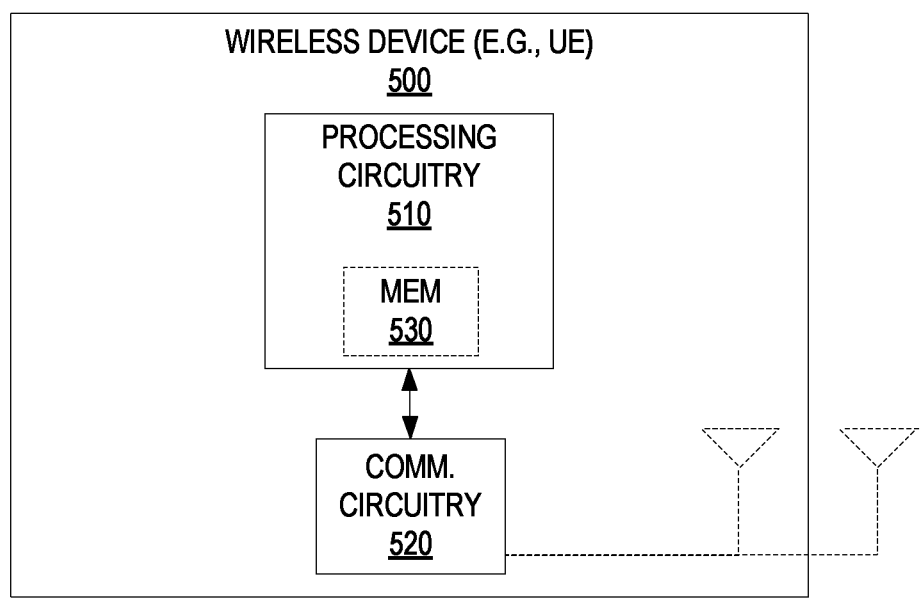
FIG. 5 is a block diagram of a wireless device according to some embodiments.

FIG. 5 for example illustrates a wireless device 500 (e.g., wireless device 14) as implemented in accordance with one or more embodiments. As shown, the wireless device 500 includes processing circuitry 510 and communication circuitry 520. The communication circuitry 520 (e.g., radio circuitry) is configured to transmit and/or receive information to and/or from one or more other nodes, e.g., via any communication technology. Such communication may occur via one or more antennas that are either internal or external to the wireless device 500. The processing circuitry 510 is configured to perform processing described above, e.g., in FIGS. 2, 3, and/or 4, such as by executing instructions stored in memory 530. The processing circuitry 510 in this regard may implement certain functional means, units, or modules.

Figure 6:
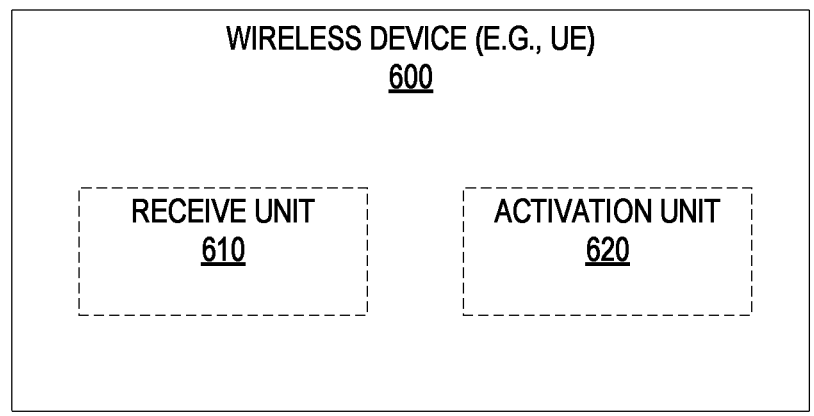
FIG. 6 is a block diagram of a wireless device according to other embodiments.
Figure 11:
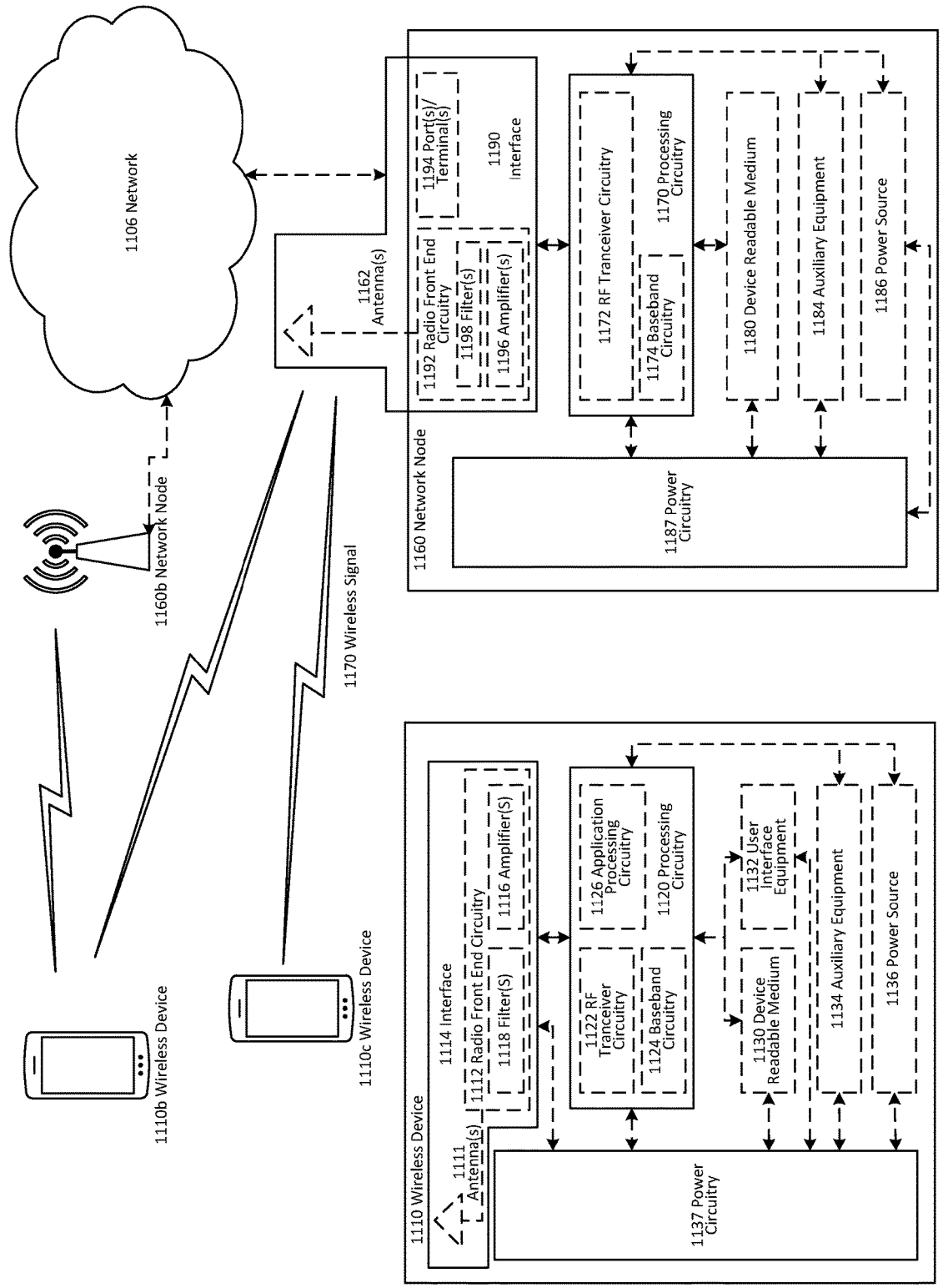
FIG. 11 is a block diagram of a wireless communication network according to some embodiments.

FIG. 6 illustrates a schematic block diagram of a wireless device 600 (e.g., wireless device 14) in a wireless network according to still other embodiments (for example, the wireless network shown in FIG. 11). As shown, the wireless device 600 implements various functional means, units, or modules, e.g., via the processing circuitry 510 in FIG. 5 and/or via software code. These functional means, units, or modules, e.g., for implementing the method(s) herein, include for instance a receive unit 610 for receiving the activation command as described above and/or an activation unit 620 for activating the serving cell as described above.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

The fifth generation of mobile communication systems (5G; NR—new radio) is based on both reuse/refarming of carrier frequencies up to 6 GHz, and on usage of carrier frequencies above 24 GHz. The former frequency range may be referred to as FR1 (frequency range 1) and the latter as FR2 (frequency range 2) or mmW (millimeter wave). The technical solutions very much differ between the two frequency ranges. For FR1, it is assumed that the user equipment (UE) as a baseline is omnidirectional when it comes to reception and transmission (although precoding/digital beamforming can be applied), whereas for FR2, it is assumed that beamforming using a larger number of antenna elements is used for reception and transmission. For FR1, it is assumed that a UE has 2-4 antennas for simultaneous reception, whereas for FR2, it is assumed that the UE has an antenna array of e.g. 8, 16, 64 or more antenna elements, arranged in a matrix of e.g. 2×4, 4×4, 8×8 elements, for the reception.

In a UE radio receiver for FR1 (and for legacy such as 3G (UTRA; WCDMA, TD-SCDMA) and 4G (E-UTRA; LTE)), each antenna is connected to an LNA (low noise amplifier), mixer, amplifier, and further to an ADC (analog to digital converter), by which the signals received from each antenna are made available to the baseband as a digital stream of radio samples. In the baseband, the UE can combine the antenna streams in different manners (summation of received streams of radio samples using phase shifts, gain shifts, time delays, etc for the different streams), to achieve beamforming. This is referred to as digital beamforming. Depending on baseband capabilities (e.g. DSP (digital signal processor) capacity or hardware capacity), the UE can receive many beams from different spatial directions simultaneously in the baseband.

For UE radio receivers for FR2, due to the larger number of antenna elements needed to receive and transmit signals, UE vendors consider it would result in too high hardware complexity to have each of the e.g. 64 antenna elements connected to a separate LNA, mixer, amplifier and ADC. Therefore the UE vendors propose the use of analog or hybrid beamforming instead of digital beamforming. In analog and hybrid beamforming, groups of antenna elements are connected to each other electrically, and one can control the phase of each antenna element in the group. Received signals are combined electrically before being passed on to the radio receiver. Hence instead of having a full receiver chain (LNA, mixer, amplifier, ADC) for each of the e.g. 64 antenna elements, one such receiver chain is needed per group of antenna elements. The groups are referred to as subarrays.

Figure 7:
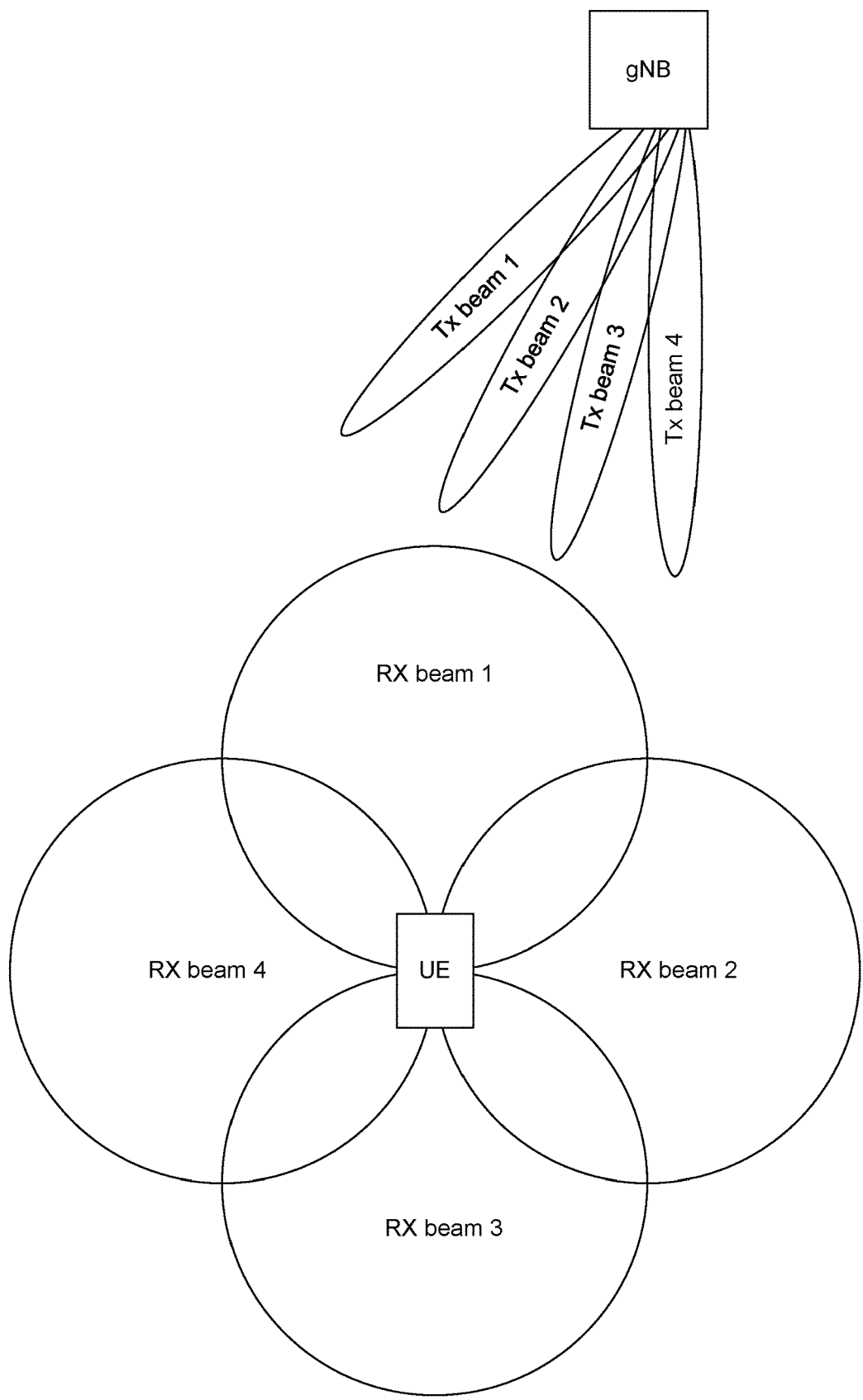
FIG. 7 is a block diagram of a wireless device's receive beams and a radio network node's transmit beams according to some embodiments.

A limitation with analog or hybrid beamforming compared to digital beamforming is that due to that groups of antenna elements are connected to each other electrically, the UE cannot receive from multiple directions simultaneously. The information on signals received from other spatial directions than the one towards which the UE currently is pointing its reception beam is lost already when combining the electrical signals from the antenna elements. Therefore, when the UE is to detect signals from other directions than it currently is receiving from, it has to carry out what is referred to as Rx beam sweeping, by which it cycles through all direction at which it can point its reception beam while trying to detect signals. FIG. 7 illustrates UE RX beams and gNB TX beams. The UE can only receive from one spatial direction at a time. In this example, the UE needs to use RX beam 1 to receive the beams transmitted by the gNB.

Figure 8A:
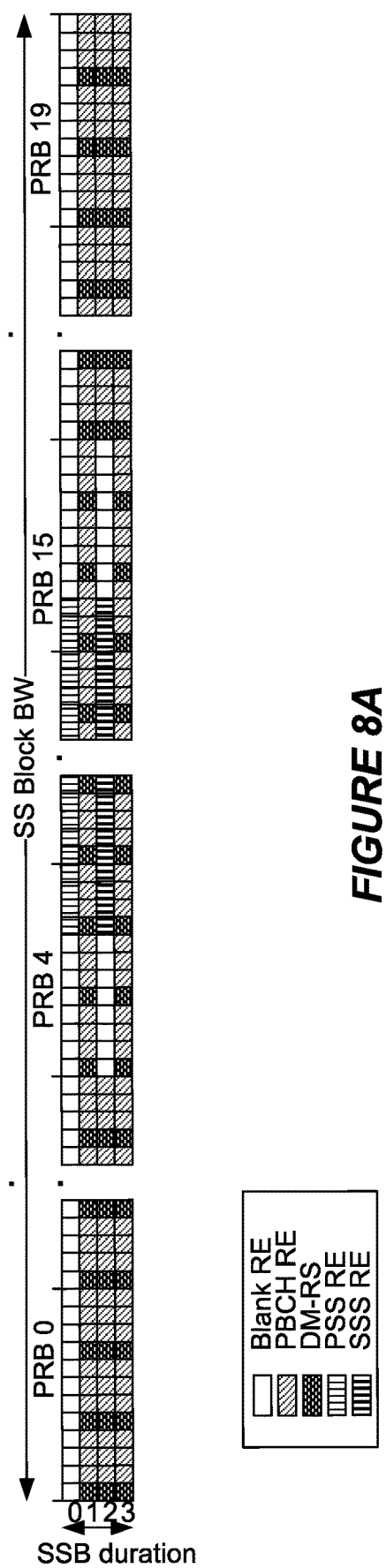
FIG. 8A is a block diagram of Synchronization Signal Blocks (SSBs) according to some embodiments.

Consider now secondary cell (SCell) activation. The synchronization signal and Physical Broadcast Channel (PBCH) block (i.e., Synchronization Signal Block, SSB) represents the only signals that can be assumed to be present in the NR cell (unless it has been signaled that SSB is not transmitted). The SSB consists of Primary Synchronization Signal (PSS), Secondary Synchronization Signal (SSS), Physical Broadcast Channel (PBCH) and Demodulation Reference Symbols (DM-RS). The individual SSB spans four adjacent Orthogonal Frequency Division Multiplexing (OFDM) symbols, as illustrated in FIG. 8A.

Figure 8B:
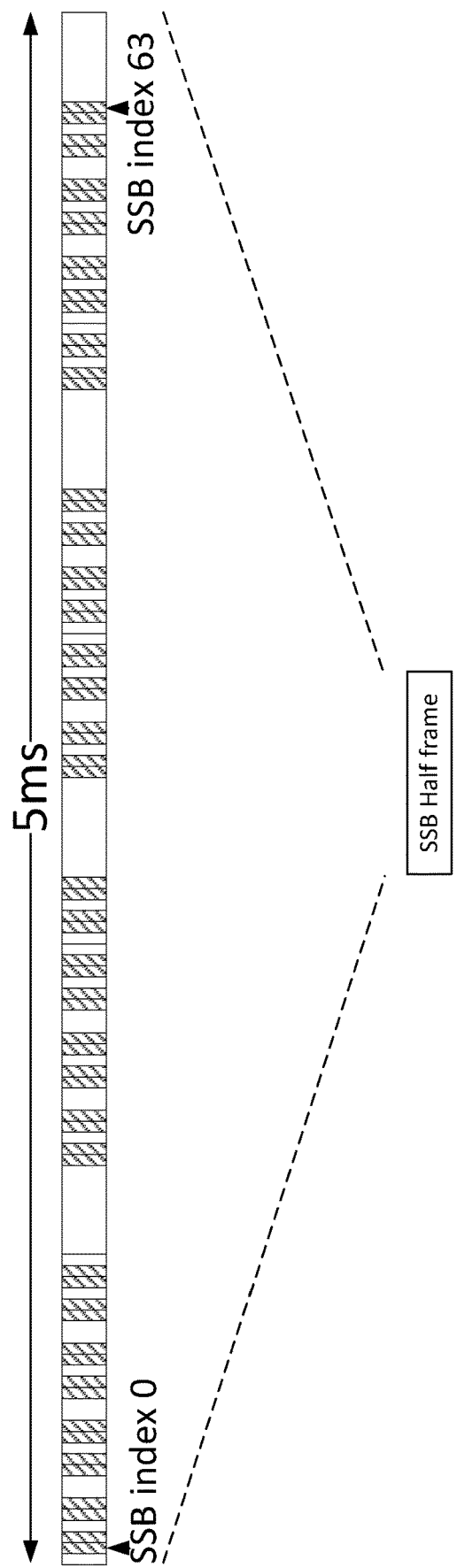
FIG. 8B is a block diagram of a half-frame containing SSBs according to some embodiments.

The SSB is transmitted within a half-frame (5 ms), denoted as a SSB burst. In the half-frame, multiple SSBs for different cells or different beams may be transmitted, as shown in FIG. 8B. The number of SSB locations in a burst depends on the frequency range, as well as on the NR numerology in use. For 120 Hz and 240 kHz SSB SCS (subcarrier spacing), which are used in FR2, the number of SSB positions, a.k.a. SSB indexes, is 64. Each index may represent a different Tx beam (transmission beam or sector) in a cell.

Figure 8C:
FIG. 8C is a block diagram of an SMTC cycle according to some embodiments.

The SSB burst (hence the individual SSBs) are transmitted according to an SSB based Radio Resource Management (RRM) SS/PBCH block measurement timing configuration (SMTC) cycle, which may be 5, 10, 20, 40, 80 or 160 ms, as shown in FIG. 8C. A typical network configuration for FR2 is that the SMTC periodicity is 20 ms.

When the UE receives an SCell activation, the position of the SSB within the SSB burst, as well as the location of the SSB, is already known to the UE via signaling in the PCell.

At SCell activation, depending on whether the cell is known or not, the UE has to go through a few steps that at least in the minimum configuration with respect to transmitted or broadcasted signals in a cell, are based on reception of SSB. The steps include for instance AGC (automatic gain control) or gain setting, detection of SCell to be activated and/or optimum Tx beam to use, and measurement and reporting of CSI (channel state information). For UEs in FR2, the activation procedure may additionally include determining which UE Rx beam to use (so called beam sweeping). This means that the activation time gets dependent on the SMTC period in use, as well as on the number of spatial directions (RX beams) that the UE investigates in the beam sweeping. If time is allowed for UE Rx beam sweeping of up to 8 spatial directions, then, existing SCell activation delay requirements for FR1 could be scaled by up to a factor 8.

There currently exist certain challenge(s). The NR SCell activation time delay requirement for activation of NR SCell belonging to FR2 proves complicated, due in part to the question of how to scale up the NR SCell activation time delay requirement for NR SCell in FR1 to take into account UE Rx beam sweeping in FR2. A scaling by 4-8 times the FR1 activation time for FR2 for typical cell configurations (SMTC period of 20 ms) would result in activation times of 320-640 ms. As a comparison, a typical SCell activation time in E-UTRA is 24-34 ms.

The assumed baseline for UE architecture for FR2 is based on analog or hybrid beamforming, meaning that the UE can only receive from one direction at a time. This contrasts with the UE architecture assumed for FR1, which is based on digital beamforming and thus does not have such limitations.

Many of the CA (carrier aggregation) scenarios envisioned for NR in FR2 are intra-band scenarios, meaning that the cells that are aggregated are within the same frequency band. Since the bandwidth of cells within a frequency band is highly configurable, with a cell bandwidth ranging from 50 to 400 MHz, an aggregated bandwidth ranging from 200 to 1200 MHz, and up to 8 aggregated cells or CCs (component carriers), it is likely that for intra-band CA scenarios, for UE complexity reasons, cells on different CCs within the same frequency band or frequency subband will have to be served using the same UE antenna array. A consequence of this is that since analog or hybrid beamforming rather than digital beamforming is the baseline, there will be constraints on from which spatial directions the UE receives the set of aggregated cells.

The limitation on received directions may have an impact on several UE procedures, including SCell activation in FR2 and the expected UE behavior in intra-band carrier aggregation in FR2.

Certain aspects of the present disclosure and their embodiments may provide solutions to these or other challenges. Some embodiments impose a rule for carrier aggregation in FR2 that states that when an SCell is to be added (or activated), the connectivity to already activated cells (PCell, PSCell, SCells) in that frequency band or frequency subband shall be prioritized. The rule implies that the UE shall not change the analog settings for the UE Rx beam when activating the SCell, since this would jeopardize the reception of already activated cells that are served by the same UE antenna array.

With the above defined rule, there is no need for UE Rx beam sweeping when activating the SCell, if there already are activated cells in that frequency band or frequency subband. A consequence of this is that the SCell activation procedure can be quicker than had the UE first conducted Rx beam sweeping during the activation.

Particularly, if the SCell being activated is known and belongs to FR2, and if at least one of the following conditions are met: (i) the SCell being activated and the PCell are in the same band (or subband); (ii) the SCell being activated and the PSCell are in the same band (or subband) and (iii) there is at least one activated SCell in the same band (or subband) as of the SCell being activated, then the SCell activation time (Tactivation_time) shall not include additional time for UE Rx beam sweeping, and hence can be made shorter (40-80 ms for typical cell configurations).

Concretely this means that when a new SCell is activated, and the SCell is within a frequency range of other already activated cell(s), and the frequency range is served by the same UE antenna array, the SCell to be activated is not allowed to change the UE Rx beam since this would lead to that communication with already activated cell(s) would be degraded or lost. Instead the SCell shall be activated under restrictions on the UE Rx beam used by the already activated cells.

Certain embodiments may provide one or more of the following technical advantage(s). NR SCell activation times become shorter and the system works better (gNB scheduling and load balancing, UE power consumption) than if merely scaling existing SCell activation time to account for Rx beam sweeping.

In some embodiments a non-limiting term "UE" is used. The UE herein can be any type of wireless device capable of communicating with network node or another UE over radio signals. The UE may also be radio communication device, target device, device to device (D2D) UE, machine type UE or UE capable of machine to machine communication (M2M), a sensor equipped with UE, Tablet, mobile terminals, smart phone, laptop embedded equipped (LEE), laptop mounted equipment (LME), USB dongles, Customer Premises Equipment (CPE) etc.

Also in some embodiments generic terminology "network node", is used. It can be any kind of network node which may comprise a radio network node such as base station, radio base station, base transceiver station, base station controller, network controller, gNB, NR BS, evolved Node B (eNB), Node B, Multi-cell/multicast Coordination Entity (MCE), relay node, access point, radio access point, Remote Radio Unit (RRU) Remote Radio Head (RRH), a multi-standard BS (a.k.a. MSR BS), a core network node (e.g., MME, SON node, a coordinating node, positioning node, MDT node, etc.) etc. The network node may also comprise a test equipment.

The embodiments are applicable to single carrier as well as to multicarrier operation of the UE. Examples of multi-carrier operation of the UE are carrier aggregation (CA) and multi-connectivity (MC). In CA the UE is able to receive and/or transmit data to more than one serving cells. Dual Connectivity (DC) is a special case or example of MC. The DC comprises one main cell group (MCG) containing at least PCell and one secondary cell group (SCG) containing at least PSCell. The term carrier aggregation (CA) is also called (e.g. interchangeably called) "multi-carrier system", "multi-cell operation", "multi-carrier operation", "multi-carrier" transmission and/or reception. In CA one of the component carriers (CCs) is the primary component carrier (PCC) or simply primary carrier or even anchor carrier. The remaining ones are called secondary component carrier (SCC) or simply secondary carriers or even supplementary carriers. The serving cell is interchangeably called as primary cell (PCell) or primary serving cell (PSC). Similarly the secondary serving cell is interchangeably called as secondary cell (SCell) or secondary serving cell (SSC). In one example of DC operation involving E-UTRA and NR, the E-UTRA is the master. In another example of the DC operation involving E-UTRA and NR, NR is the master. The DC operation may also involve only NR serving cells (e.g. NR PCell, NR PSCell and NR SCells) or LTE serving cells (e.g. LTE PCell, LTE PSCell and LTE SCells).

The term activation used herein may refer to activation of a serving cell, addition of serving cell, configuration of serving cell etc. The term deactivation may refer to deactivation of serving cell, release of serving cell, deconfiguration of serving cell etc. Examples of serving cell are SCell, PSCell etc. Examples of activation procedure are activation of SCell, addition of PSCell etc. SCell activation may also be called as SCell addition. Examples of deactivation procedure are deactivation of SCell, release of PSCell etc.

In some embodiments, a serving cell may be configured on a semi-static basis (e.g., using RRC) but may be activated/de-activated on a more dynamic basis (e.g., via MAC CEs). Such dynamic activation or de-activation may be based on cell load, channel conditions, etc.

One scenario comprises a UE that is configured with at least one serving cell (PCell) and is further configured to activate a second serving cell (cell2) e.g. activate SCell. The UE can be configured by a network node (e.g. node serving or controlling PSC) for activating cell2 by a message e.g. MAC command, RRC message, L1 message e.g. via DCI message sent on DL control channel such as PDCCH etc. Cell2 is from UE perspective in deactivated state before receiving the activation command or message. The UE upon receiving the configuration message shall initiate the activation of cell2.

According to some embodiments, the UE shall activate cell2 within a certain serving cell activation time (Tactivation_time), which depends on whether there already is one or more activated cells within the frequency band to which cell2 belongs. The frequency band may for instance be: (i) a full frequency band defined in the 3GPP standard (e.g. "n257", "n258", "n260", "n261"), or (ii) may be parts thereof, i.e., a subband ("CA_n257B", "CA_n257D", "CA_257(2A)", "CA_257(3A)", etc. . . . ), or (iii) may alternatively be a range of frequencies that is deduced from UE architecture, or from reported UE RF capabilities.

Standardized frequency bands for FR2 are specified in 3GPP TS 38.101-2 Section 5 (3GPP Technical Specification Group Radio Access Network; NR; User Equipment (UE) radio transmission and reception; Part 2: Range 2 Stand-alone (Release 15)). For example, frequency range FR1 may be 450 MHz to 6000 MHz whereas frequency range FR2 may be from 24250 Mhz to 52600 MHz. FIG. 9A shows what is referred to as Table 5.2-1 which defines operating bands within which NR is designed to operate within FR2. FIG. 9B then shows the operating bands within which NR intra-band contiguous carrier aggregation is designed to operate. All operating bands are within FR2. Finally, FIG. 9C shows the operating bands within which NR inter-band carrier aggregation is designed to operate. Again, all operating bands are within FR2.

In this context, the UE behaviour according to some embodiments herein may for instance be captured through a requirement in the 3GPP TS 38.133 specification as follows, with a distinction made on whether there already are activated intra-band neighbour cells in FR2.

8.3.2 SCell Activation Delay Requirement for Deactivated SCell

The requirements in this section shall apply for the UE configured with one downlink SCell in SCG.

The delay within which the UE shall be able to activate the deactivated SCell in SCG depends upon the specified conditions.

Upon receiving SCG SCell activation command in slot n, the UE shall be capable to transmit valid channel state information (CSI) report and apply actions related to the activation command for the SCell being activated no later than in slot $n+[T_{HARQ}+T_{activation\_time}+T_{CSI\_Reporting}]$
Where:
  $T_{HARQ}$ is the timing between DL data transmission and acknowledgement
  $T_{activation\_time}$ is the SCell activation delay. If the SCell is known and belongs to FR1, $T_{activation\_time}$ is:
    [3 ms+1*SMTC periodicity+4*OFDM symbol], if the SCell measurement cycle is equal to or smaller than [160 ms].
    [3 ms+2*SMTC periodicity+4*OFDM symbol], if the SCell measurement cycle is larger than [160 ms].
  If the SCell is unknown and belongs to FR1, $T_{activation\_time}$ is:
    [3 ms+4*SMTC periodicity+4*OFDM symbol] provided the SCell can be successfully detected on the first attempt.
  If the SCell being activated is known and belongs to FR2, and there are no activated cells on intra-band CCs, $T_{activation\_time}$ is [TBD].
  If the SCell being activated is known and belongs to FR2, and there is at least one activated cell on an intra-band CC, $T_{activation\_time}$ is:
    [3 ms+1*SMTC periodicity+4*OFDM symbol], if the SCell measurement cycle is equal to or smaller than [160 ms].
    [3 ms+2*SMTC periodicity+4*OFDM symbol], if the SCell measurement cycle is larger than [160 ms].
  If the SCell being activated is unknown and belongs to FR2, and there are no activated cells on intra-band CCs, $T_{activation\_time}$ is [TBD].
  If the SCell being activated is unknown and belongs to FR2, and there is at least one activated cell on an intra-band CC, $T_{activation\_time}$ is:
    [3 ms+4*SMTC periodicity+4*OFDM symbol] provided the SCell can be successfully detected on the first attempt.
  $T_{CSI\_reporting}$ is the delay uncertainty in acquiring the first available CSI reporting resources.

Figure 10:
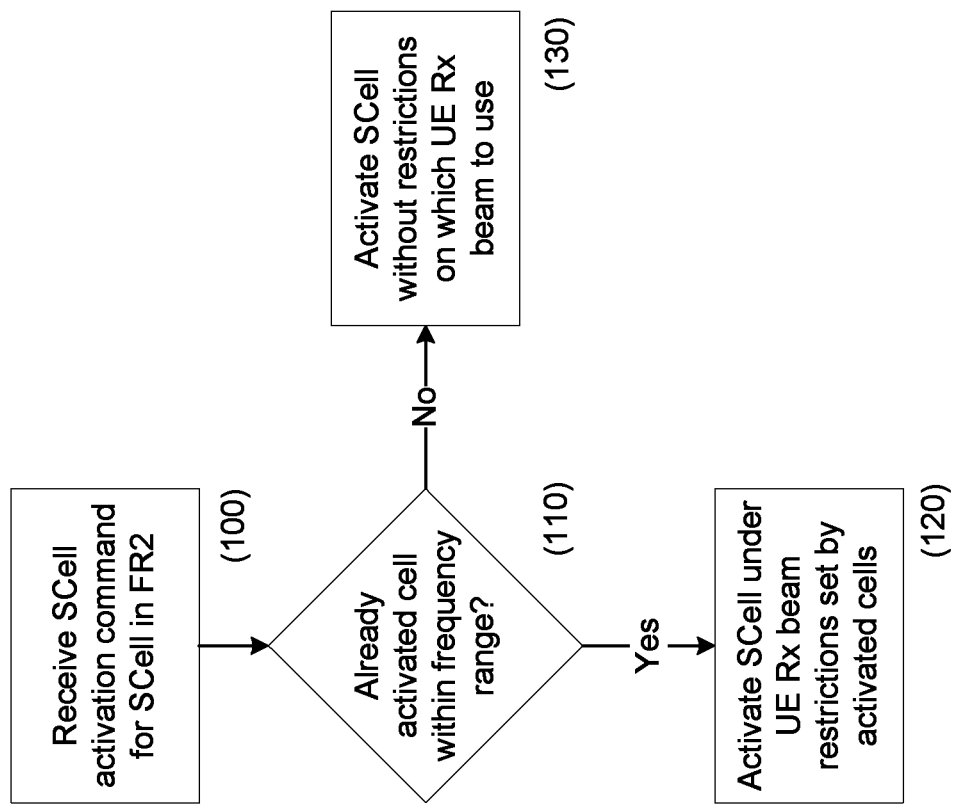
FIG. 10 is a logic flow diagram of a method performed by a wireless device according to some embodiments.

As shown in FIG. 10, the UE according to some embodiments receives an SCell activation command (100). It checks whether there already is an activated cell (PCell, PSCell, SCell) within the frequency range for which the UE has resource restrictions in terms of sharing the same antenna array. If so (110: Yes), the UE carries out the SCell activation under the restriction that it has to use the same UE Rx beam as already used by the active cells (120). At a later point, after the new SCell has been activated, the UE may change the UE Rx beam, but then based on feedback (throughput, signal quality, signal strength, channel state information, etc) from all activated cells. In some embodiments, then, the activated cells that share resources (e.g., RX beam) will have to use the same Rx beam setting, so a change to the RX beam setting may mean that it is changed for all of the activated cells (using that setting) at the same time.

If there are no activated cells in the frequency range for which the UE has resource restrictions in terms of sharing the same antenna array (110: No), the UE carries out the SCell activation without restrictions on to which spatial direction to receive the signals from (130). Hence in this activation procedure, the UE may have to conduct UE Rx beam sweeping to decide the optimum Rx beam. As a result, this activation procedure may take longer time.

The reason for resource restriction in the UE depends on the UE RF architecture e.g. whether UE has one broadband radio chain to receive multiple carriers (e.g. PCell, SCell, etc) or separate receivers for receiving individual carriers. For example when carriers are in the same band or are within certain range (Fs) (e.g. within 400 MHz) or not separated by certain frequency (Fg) (e.g. Fg=200 MHz) then the UE may receive more than one carrier using the same receivers and therefore the UE can use AGC settings for all other carriers in the same band or within Fs or not separated by more than Fg. This is described with several examples below.

In one specific example, if the SCell being activated is known and belongs to FR2, and if at least one of the following conditions are met: (i) the SCell being activated and the PCell are in the same band; (ii) the SCell being activated and the PSCell are in the same band; and (iii) there is at least one activated SCell in the same band as of the SCell being activated, then $T_{activation\_time}$ shall be as defined below:
  [3 ms+1*SMTC periodicity+4*OFDM symbol], if the SCell measurement cycle is equal to or smaller than [160 ms].
  [3 ms+2*SMTC periodicity+4*OFDM symbol], if the SCell measurement cycle is larger than [160 ms].

On the other hand, if the SCell being activated is unknown and belongs to FR2, and none of the following condition is met: (i) the SCell being activated and the PCell are in the same band; (ii) the SCell being activated and the PSCell are in the same band and (iii) there is at least one activated SCell in the same band as of the SCell being activated, then $T_{activation\_time}$ shall be [TBD].

If the SCell being activated is unknown and belongs to FR2, and if at least one of the following conditions are met: (i) the SCell being activated and the PCell are in the same band; (ii) the SCell being activated and the PSCell are in the same band and (iii) there is at least one activated SCell in the same band as of the SCell being activated, then $T_{activation\_time}$ shall be as defined below: [3 ms+4*SMTC periodicity+4*OFDM symbol] provided the SCell can be successfully detected on the first attempt.

In another (second) specific example, if the SCell being activated is known and belongs to FR2, and if at least one of the following conditions are met: (i) the SCell being activated and the PCell are within a certain frequency range (Fs), (ii) the SCell being activated and the PSCell are within Fs and (iii) there is at least one activated SCell and the SCell being activated are within Fs, then $T_{activation\_time}$ shall be as defined below:

[3 ms+1*SMTC periodicity+4*OFDM symbol], if the SCell measurement cycle is equal to or smaller than [160 ms].

[3 ms+2*SMTC periodicity+4*OFDM symbol], if the SCell measurement cycle is larger than [160 ms].

If the SCell being activated is unknown and belongs to FR2, and none of the following conditions is met: (i) the SCell being activated and the PCell are within Fs, (ii) the SCell being activated and the PSCell are within Fs and (iii) there is at least one activated SCell and the SCell being activated are within Fs, then $T_{activation\_time}$ shall be [TBD].

If the SCell being activated is unknown and belongs to FR2, and if at least one of the following conditions are met: (i) the SCell being activated and the PCell are within Fs, (ii) the SCell being activated and the PSCell are within Fs and (iii) there is at least one activated SCell and the SCell being activated are within Fs, then $T_{activation\_time}$ shall be as defined below: [3 ms+4*SMTC periodicity+4*OFDM symbol] provided the SCell can be successfully detected on the first attempt.

In yet another (third) specific example: if the SCell being activated is known and belongs to FR2, and if at least one of the following conditions are met: (i) the SCell being activated and the PCell are within a certain frequency range (Fs) of the same band, (ii) the SCell being activated and the PSCell are within Fs of the same band, and (iii) there is at least one activated SCell and the SCell being activated are within Fs of the same band, then $T_{activation\_time}$ shall be as defined below:

[3 ms+1*SMTC periodicity+4*OFDM symbol], if the SCell measurement cycle is equal to or smaller than [160 ms].

[3 ms+2*SMTC periodicity+4*OFDM symbol], if the SCell measurement cycle is larger than [160 ms].

If the SCell being activated is unknown and belongs to FR2, and none of the following conditions is met: (i) the SCell being activated and the PCell are within Fs of the same band, (ii) the SCell being activated and the PSCell are within Fs and (iii) there is at least one activated SCell and the SCell being activated are within Fs of the same band, then $T_{activation\_time}$ shall be [TBD].

If the SCell being activated is unknown and belongs to FR2, and if at least one of the following conditions are met: (i) the SCell being activated and the PCell are within Fs of the same band, (ii) the SCell being activated and the PSCell are within Fs of the same band and (iii) there is at least one activated SCell and the SCell being activated are within Fs of the same band, then $T_{activation\_time}$ shall be as defined below: [3 ms+4*SMTC periodicity+4*OFDM symbol] provided the SCell can be successfully detected on the first attempt.

In the examples above, the terms "known" and "unknown" cells are used with respect to FR2. The definition in FR1 (as well as in E-UTRA and UTRA) is based on that the UE has detected, measured and reported the cell within a certain time frame, and that it remains detectable (from 3GPP TS 38.133 section 8.3.2): SCell in FR1 is known if it has been meeting the following conditions during the period equal to max([5] measCycleSCell, [5] DRX cycles) for FR1 before the reception of the SCell activation command: (i) the UE has sent a valid measurement report for the SCell being activated and (ii) the SSB measured remains detectable according to the cell identification conditions and (iii) the SSB measured during the period equal to max([5] measCycleSCell, [5] DRX cycles) also remains detectable during the SCell activation delay according to the cell identification conditions. Otherwise SCell in FR1 is unknown.

The distinction in FR1 is made since if the cell is known, there are certain steps that can be bypassed in the activation procedure. For instance, the UE already has detailed information on the timing of the cell, and further, on the received power (impacting gain setting and AGC).

The corresponding definition for FR2 may be complicated by the fact that if the UE switches its Rx beam—and the decision is based on already activated cell(s) in the band or subband—somewhere between the point in time when the SCell to-be-activated was last measured, and the point in time when the UE receives the SCell activation command, the SCell to-be-activated might not be possible to receive anymore. However, under the UE resource restrictions the SCell would then anyway not be possible to aggregate with the already activated cells. In this case the activation will result in a failure, which the gNB will get aware about from receiving CQI zero (0) in measurement reports from the UE at expiration of the $T_{HARQ}$+Tactivation_time+$T_{CSI\_reporting}$ (see specification example above). Whether the SCell to be activated is considered to be "known" or "unknown" does not matter in this case.

Accordingly, in some embodiments, the definition in FR2 is similarly based on that the UE has detected, measured and reported the cell within a certain time frame, and that it remains detectable, e.g., similarly as described in 3GPP TS 38.133 section 8.3.2 for FR1.

Some embodiments introduce split activation delay requirements for SCell belonging to FR2, with: one set of requirements for the case when there are already activated cells on intra-band CC, and another set for the case when there are no such activated cells. For the former case, it is assumed that no UE Rx beam sweeping is needed, and therefore requirements for FR1 are reused. Otherwise, without some embodiments herein, SCell activation delay core requirements for FR2 will be too loose for the intra-band CA cases for load balancing and dynamic adaptation of UE throughput to work satisfactory.

Generally, then, the core requirement for SCell activation delay requirement for SCell belonging to FR2 is complicated by questions surrounding the need for, and extent of, UE Rx beam sweeping. Some embodiments recognize cases when UE Rx beam sweeping shall not be allowed or is not needed when activating an SCell that belongs to FR2.

More particularly, one approach would be to require UE Rx beam sweeping regardless of whether the SCell is known or unknown. Some embodiments consider that whereas this might be applicable for inter-band carrier aggregation, it is not needed for intra-band carrier aggregation, or for the case when there is already one activated CC in the FR2 band to which the SCell-to-be-activated belongs. The rationale is that analog beamforming is assumed as baseline for FR2, hence the baseline UE can only receive from one direction at a time from each antenna array. Further, as baseline, one may assume that the same antenna array is serving the whole band. This means that in order to guarantee maintained connectivity in already activated intra-band neighbour SCells, the SCell-to-be-added has to be received from the same direction—by which there is no need for UE Rx beam sweeping during the activation. In other words, during activation, the SCell will have to use the UE Rx beam that has been selected by the beam management functionality for the already activated SCell(s) in that frequency band.

Accordingly, during activation of SCell in FR2, priority in some embodiments shall be given to maintaining connectivity to already activated SCells on intra-band CCs. Hence the SCell-to-be-activated shall use the same UE Rx beam as used for the already activated SCells. As a consequence, some embodiments propose that SCell activation delay core requirements for FR2 are split into two cases: (i) Activation of SCell with other active intra-band CCs, and (ii) Activation of SCell without other active intra-band CCs. For the first case, the requirements may be based on that no UE Rx beam sweeping is needed, and for the latter case, the requirements may be based on that UE Rx beam sweeping is needed.

As another proposal, SCell activation delay core requirements for FR2 are in some embodiments split into two cases: Activation of SCell with and without other active cells on intra-band CCs. In the former case, requirements assume that no UE Rx beam sweeping is carried out during the activation.

Regarding the SCell activation delay requirement, some embodiments propose that for the case when there are active cells on intra-band CCs, the requirements for FR1 are reused as described above.

As another proposal, for the SCell in FR2 activation case where there is at least one active cell on an intra-band CC, the activation delay requirements for FR1 can be reused.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network 1106, network nodes 1160 and 1160*b*, and WDs 1110, 1110*b*, and 1110*c*. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or Zig Bee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units.

In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signalling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 11 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 12:
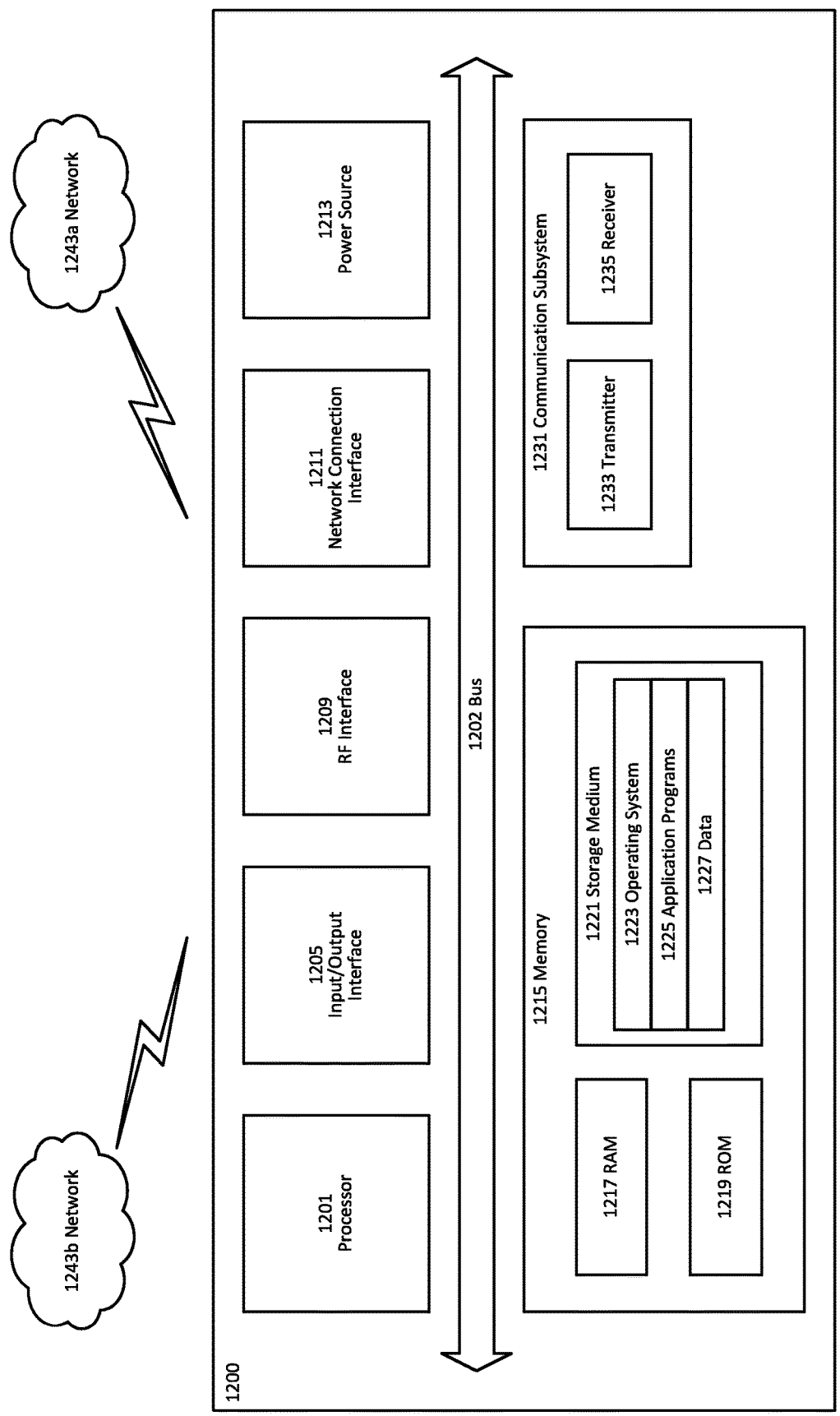
FIG. 12 is a block diagram of a user equipment according to some embodiments.

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 12200 may be any UE identified by the 3rd Generation Partnership Project (3GPP), including a NB-IoT UE, a machine type communication (MTC) UE, and/or an enhanced MTC (eMTC) UE. UE 1200, as illustrated in FIG. 12, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface 1209 may be configured to provide a communication interface to RF components such as a transmitter, a receiver, and an antenna. Network connection interface 1211 may be configured to provide a communication interface to network 1243a. Network 1243a may encompass wired and/or wireless networks such as a local-area network (LAN), a wide-area network (WAN), a computer network, a wireless network, a telecommunications network, another like network or any combination thereof. For example, network 1243a may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 12, processing circuitry 1201 may be configured to communicate with network 1243*b* using communication subsystem 1231. Network 1243*a* and network 1243*b* may be the same network or networks or different network or networks. Communication subsystem 1231 may be configured to include one or more transceivers used to communicate with network 1243*b*. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.12, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243*b* may encompass wired and/or wireless networks such as a local-area network (LAN), a wide-area network (WAN), a computer network, a wireless network, a telecommunications network, another like network or any combination thereof. For example, network 1243*b* may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 13:
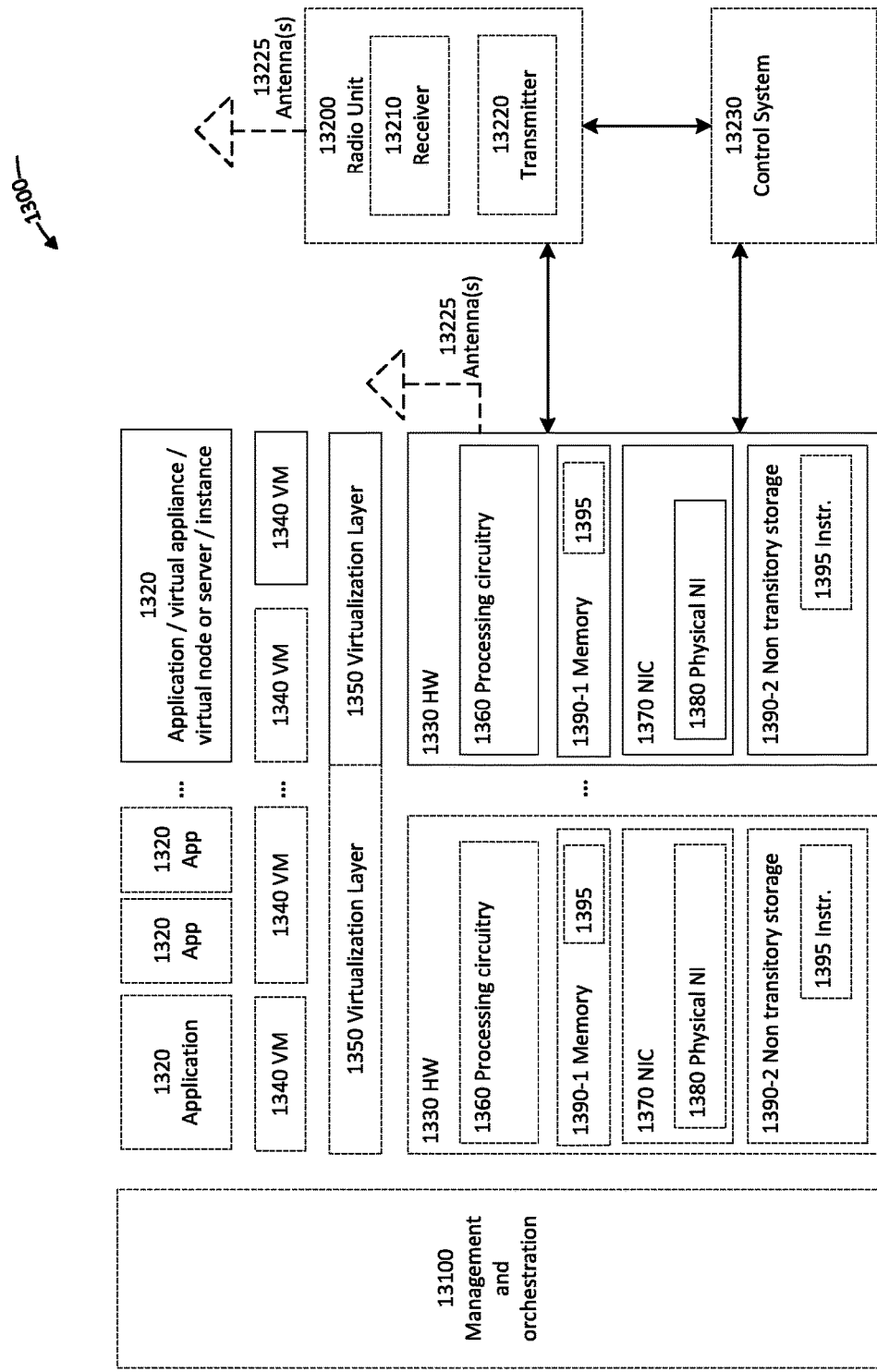
FIG. 13 is a block diagram of a virtualization environment according to some embodiments.

FIG. 13 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 13, hardware 1330 may be a standalone network node with generic or specific components. Hardware 1330 may comprise antenna 13225 and may implement some functions via virtualization. Alternatively, hardware 1330 may be part of a larger cluster of hardware (e.g. such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 13.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signalling can be effected with the use of control system 13230 which may alternatively be used for communication between the hardware nodes 1330 and radio units 13200.

Figure 14:
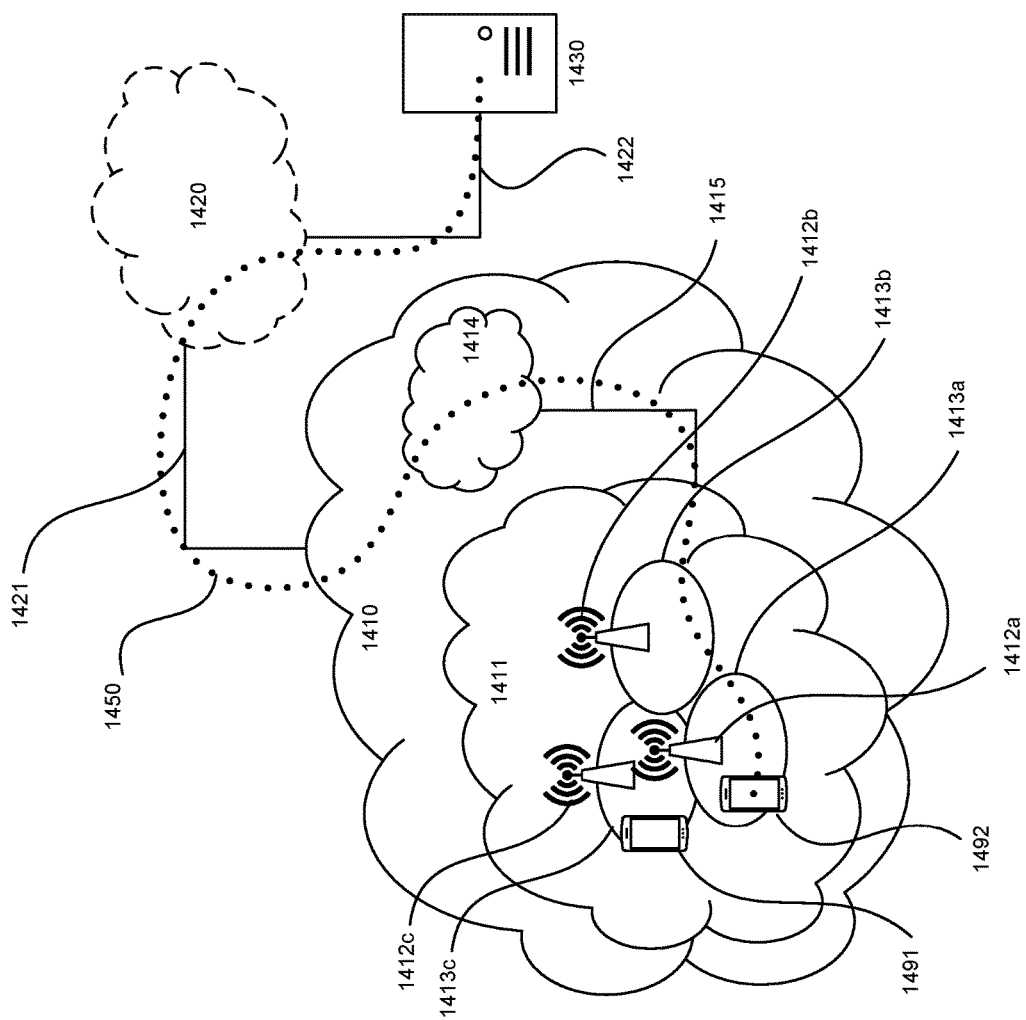
FIG. 14 is a block diagram of a communication network with a host computer according to some embodiments.

FIG. 14 illustrates a telecommunication network connected via an intermediate network to a host computer in accordance with some embodiments. In particular, with reference to FIG. 14, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c is configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 14 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 15:
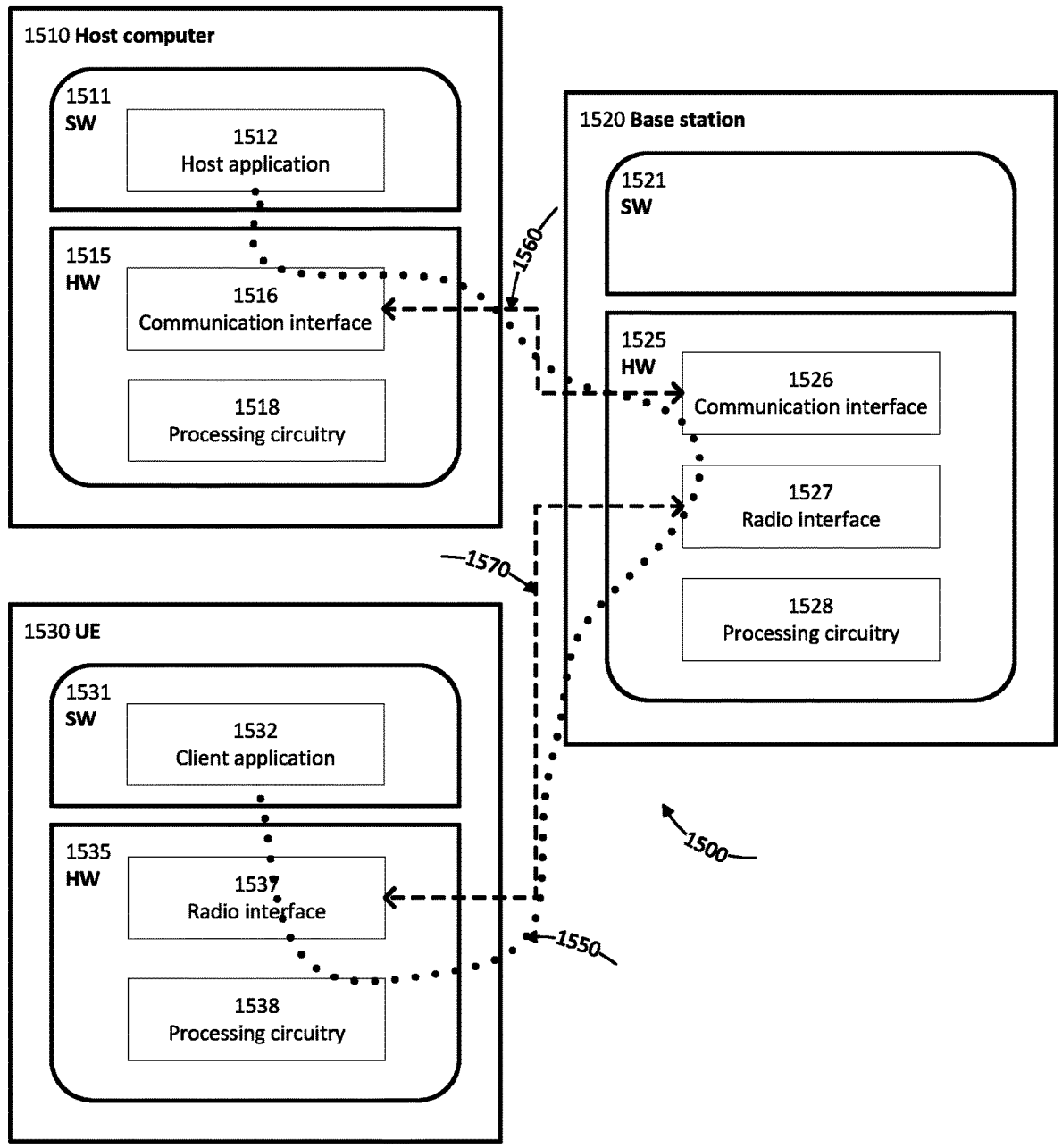
FIG. 15 is a block diagram of a host computer according to some embodiments.

Example implementations, in accordance with an embodiment, of the UE, base station and host computer discussed in the preceding paragraphs will now be described with reference to FIG. 15. FIG. 15 illustrates host computer communicating via a base station with a user equipment over a partially wireless connection in accordance with some embodiments. In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 15) served by base station 1520. Communication interface 1526 may be configured to facilitate connection 1560 to host computer 1510. Connection 1560 may be direct or it may pass through a core network (not shown in FIG. 15) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 15 may be similar or identical to host computer 1430, one of base stations 1412a, 1412b, 1412c and one of UEs 1491, 1492 of FIG. 14, respectively. This is to say, the inner workings of these entities may be as shown in FIG. 15 and independently, the surrounding network topology may be that of FIG. 14.

In FIG. 15, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may improve the latency and/or wireless device power consumption and thereby provide benefits such as reduced user waiting time, better responsiveness, and/or extended battery lifetime for wireless devices.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 16:
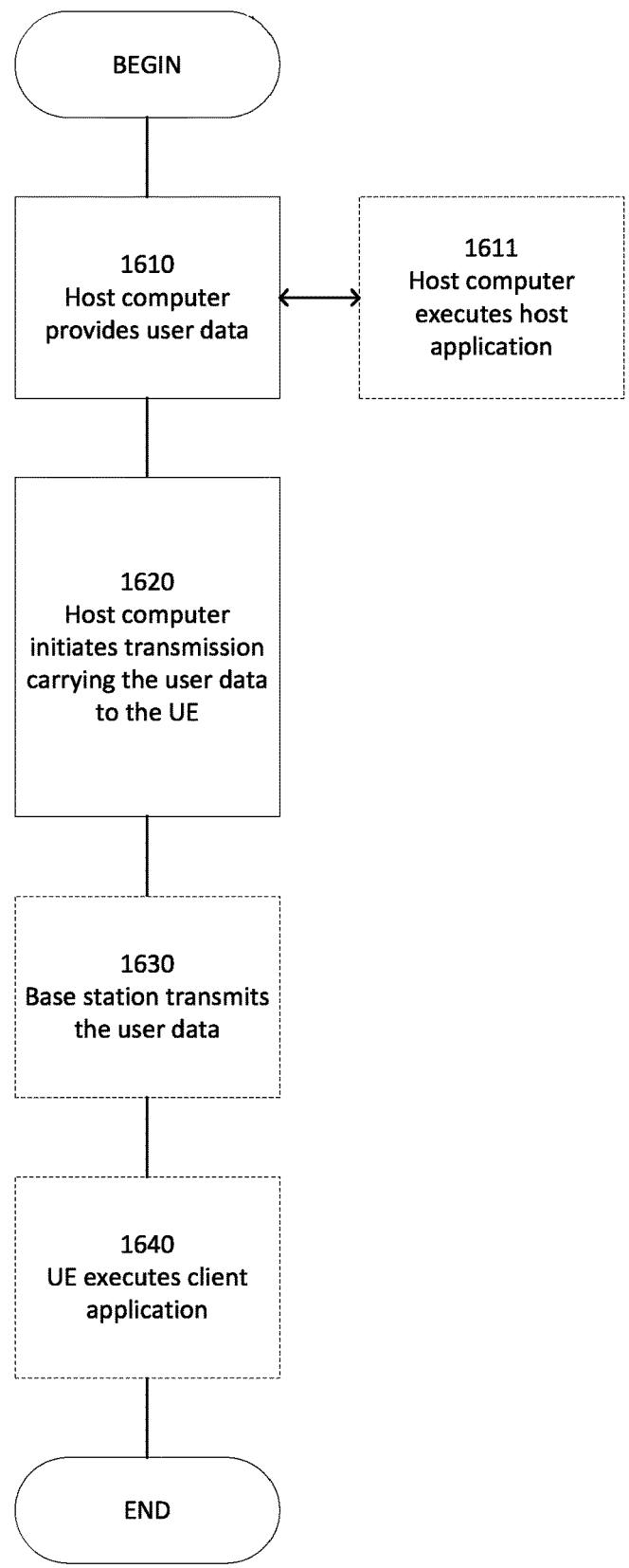
FIG. 16 is a flowchart illustrating a method implemented in a communication system, in accordance with one embodiment.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 17:
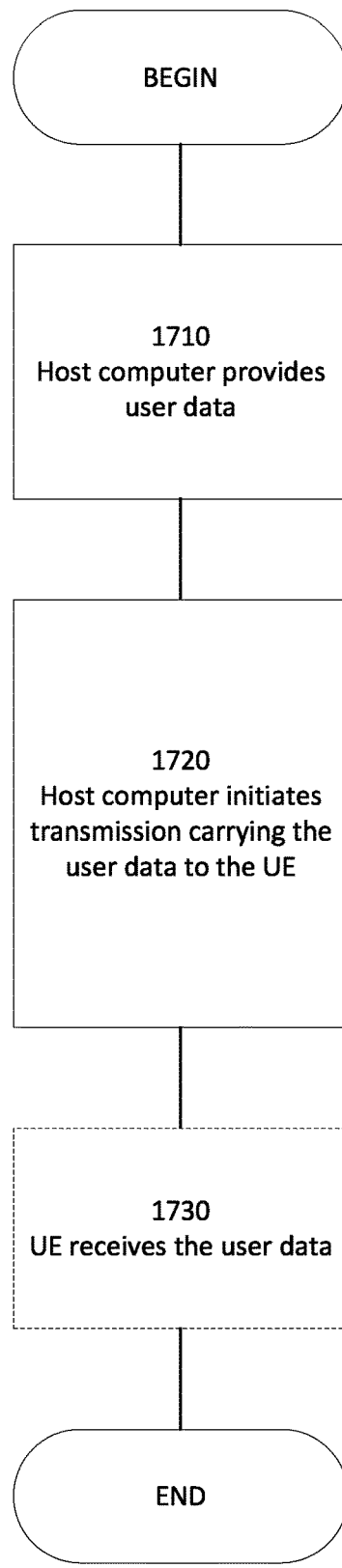
FIG. 17 is a flowchart illustrating a method implemented in a communication system, in accordance with one embodiment.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 18:
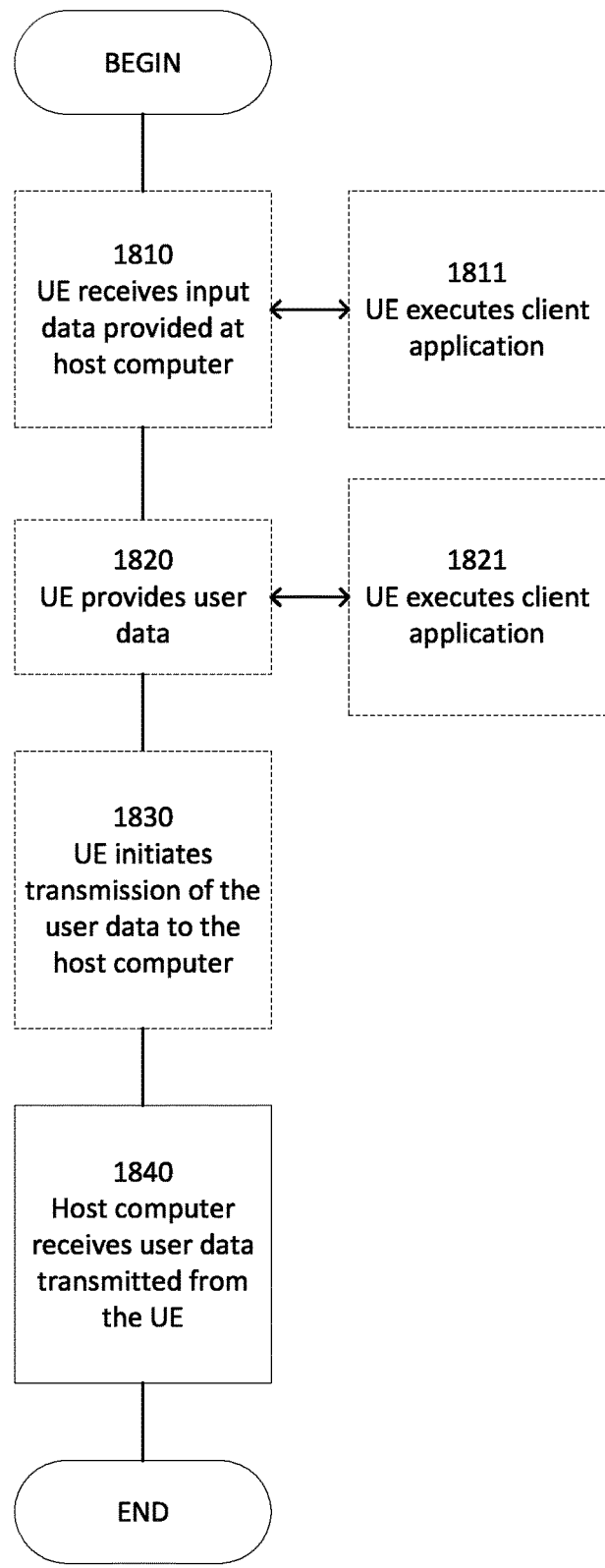
FIG. 18 is a flowchart illustrating a method implemented in a communication system, in accordance with one embodiment.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 19:
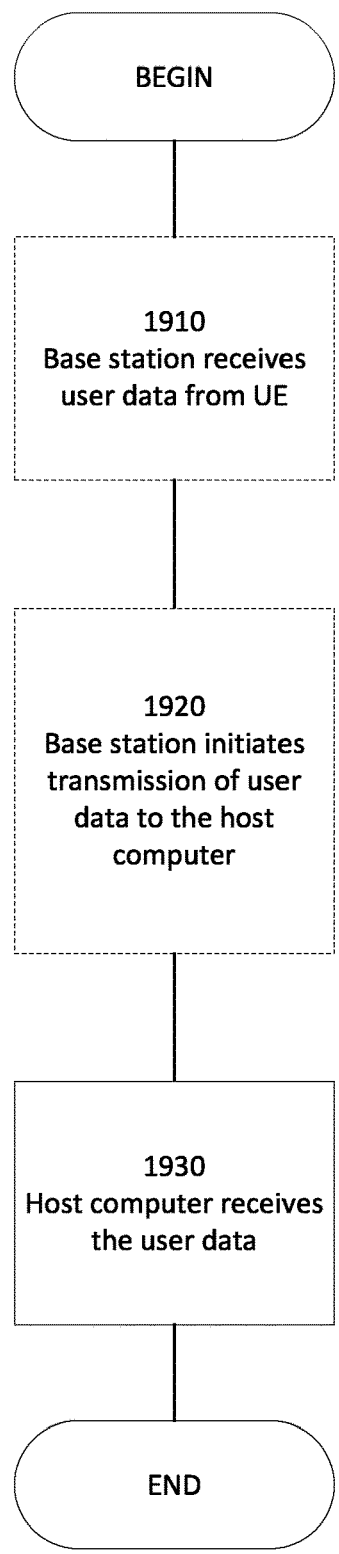
FIG. 19 is a flowchart illustrating a method implemented in a communication system, in accordance with one embodiment.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by a wireless device, the method comprising:
   receiving an activation command that commands the wireless device to activate a serving cell;
   determining whether there is at least one other serving cell already activated for the wireless device in the same frequency band as that in which the serving cell is to be activated;
   activating the serving cell within a maximum delay since receiving the activation command, the maximum delay depending on whether there is the at least one other serving cell already activated for the wireless device in a same frequency band as that in which the serving cell is to be activated;
   selecting based on whether there is the at least one other serving cell already activated for the wireless device in the same frequency band as that in which the serving cell is to be activated, one of multiple different activation procedures for activating the serving cell, at least some of the multiple different activation procedures incur different delays in cell activation, the selecting being further based on whether the wireless device has to use a same receive beam to receive simultaneously from the serving cell and the at least one other serving cell already activated for the wireless device in the same frequency band as that in which the serving cell is to be activated; and
   based on there being the at least one other serving cell already activated for the wireless device in the same frequency band as that in which the serving cell is to be activated, the selecting including selecting an activation procedure in which the wireless device refrains from conducting a receive beam sweep to determine a receive beam on which to receive from the serving cell to be activated.

2. The method of claim 1, wherein there is the at least one other serving cell already activated for the wireless device in the same frequency band as that in which the serving cell is to be activated, and wherein the method further comprises, after said activating, receiving signals from the serving cell and the at least one other serving cell simultaneously using a same antenna array and receive beam at the wireless device.

3. The method of claim 2, wherein, in order to simultaneously receive signals from the serving cell and any serving cell in the same frequency band, the wireless device is restricted to using the same antenna array and receiving beam at the wireless device.

4. The method of claim 1, wherein at least one of:
   the maximum delay depends on whether the at least one other serving cell; is a serving cell on an intra-band component carrier relative to the serving cell to be activated;
   the maximum delay is relatively shorter or longer depending respectively on whether there is the at least one other serving cell already activated for the wireless device in the same frequency band as that in which the serving cell is to be activated; and
   the maximum delay also depends on whether the serving cell to be activated is known or unknown to the wireless device.

5. The method of claim 1, wherein said same frequency band comprises:
   one of multiple New Radio, NR, operating bands included in an NR frequency range;
   a sub-band of one of the multiple NR operating bands; or
   one of multiple intra-band contiguous carrier aggregation operating bands.

6. The method of claim 1, wherein the wireless device comprises an antenna array and comprises one receiver chain per group of multiple antenna elements in the antenna array, and wherein the method further comprises performing at least one of analog beamforming and hybrid.

7. The method of claim 1, further comprising, after activating the serving cell, one or more of:
   receiving a synchronization signal block for the serving cell;
   performing automatic gain control or gain setting for the serving cell;
   detecting a transmit beam to use for the serving cell;
   performing channel state information measurement and reporting for the serving cell;
   transmitting a sounding reference signal for the serving cell;
   monitoring a control channel on or for the serving cell;
   starting a serving cell deactivation timer for the serving cell; or
   triggering a power headroom report for the serving cell.

8. The method of claim 1, wherein the serving cell is a secondary cell, SCell, and wherein the at least one other serving cell is a primary cell, PCell, a primary secondary cell, PSCell, or a secondary cell, SCell.

9. A wireless device comprising:
   communication circuitry; and processing circuitry configured to:
     receive an activation command that commands the wireless device to activate a serving cell;
     determine whether there is at least one other serving cell already activated for the wireless device in the same frequency band as that in which the serving cell is to be activated;
     activate the serving cell within a maximum delay since receiving the activation command, the maximum delay depending on whether there is the at least one other serving cell already activated for the wireless device in the same frequency band as that in which the serving cell is to be activated;
     select, based on whether there is the at least one other serving cell already activated for the wireless device in the same frequency band as that in which the serving cell is to be activated, one of multiple different activation procedures for activating the serving cell, at least some of the multiple different activation procedures incur different delays in cell activation, and further based on whether the wireless device has to use a same receive beam to receive simultaneously from the serving cell and the at least one other serving cell already activated for the wireless device in the same frequency band as that in which the serving cell is to be activated; and based on there being the at least one other serving cell already activated for the wireless device in the same frequency band as that in which the serving cell is to be activated, the selection including selecting an activation procedure in which the wireless device refrains from conducting a receive beam sweep to determine a receive beam on which to receive from the serving cell to be activated.

10. The wireless device of claim 9, wherein there is at least one other serving cell already activated for the wireless device in the same frequency band as that in which the serving cell is to be activated, and wherein the processing circuitry is further configured to, after activating the serving cell, receive signals from the serving cell and the at least one other serving cell simultaneously using the same antenna array and receiving beam at the wireless device.

11. The wireless device of claim 9, wherein, in order to simultaneously receive signals from the serving cell and any serving cell in the same frequency band, the wireless device is restricted to using the same antenna array and receiving beam at the wireless device.

12. The wireless device of claim 9, wherein at least one of:
the maximum delay depends on whether the at least one other activated serving cell is a serving cell on an intra-band component carrier relative to the serving cell to be activated; and
the maximum delay is relatively shorter or longer depending respectively on whether there is at least one other serving cell already activated for the wireless device in the same frequency band as that in which the serving cell is to be activated.

13. The wireless device of claim 9, wherein said same frequency band comprises:
one of multiple New Radio, NR, operating bands included in an NR frequency range;
a sub-band of one of the multiple NR operating bands; or
one of multiple intra-band contiguous carrier aggregation operating bands.

14. The wireless device of claim 9, wherein the maximum delay also depends on whether the serving cell to be activated is known or unknown to the wireless device.

15. The wireless device of claim 9, wherein the wireless device comprises an antenna array and comprises one receiver chain per group of multiple antenna elements in the antenna array, and wherein the processing circuitry is further configured to perform at least one of analog beamforming and hybrid beamforming.

16. The wireless device of claim 9, wherein the processing circuitry is further configured to, after activating the serving cell, one or more of:

receive a synchronization signal block for the serving cell;
perform automatic gain control or gain setting for the serving cell;
detect a transmit beam to use for the serving cell;
perform channel state information measurement and/or reporting for the serving cell;
transmit a sounding reference signal for the serving cell;
monitor a control channel on or for the serving cell;
start a serving cell deactivation timer for the serving cell; or
trigger a power headroom report for the serving cell.

17. The wireless device of claim 9, wherein the serving cell is a secondary cell, SCell, and wherein the at least one other serving cell is a primary cell, PCell, a primary secondary cell, PSCell, or a secondary cell, SCell.

18. A non-transitory computer-readable storage medium on which is stored instructions that, when executed by at least one processor of a wireless device, causes the wireless device to:
receive an activation command that commands the wireless device to activate a serving cell;
determine whether there is at least one other serving cell already activated for the wireless device in the same frequency band as that in which the serving cell is to be activated;
activate the serving cell within a maximum delay since receiving the activation command, wherein the maximum delay depends on whether there is the at least one other serving cell already activated for the wireless device in the same frequency band as that in which the serving cell is to be activated; and
select, based on whether there is the at least one other serving cell already activated for the wireless device in the same frequency band as that in which the serving cell is to be activated, one of multiple different activation procedures for activating the serving cell, at least some of the multiple different activation procedures incur different delays in cell activation, and further based on whether the wireless device has to use a same receive beam to receive simultaneously from the serving cell and the at least one other serving cell already activated for the wireless device in the same frequency band as that in which the serving cell is to be activated; and
based on there being the at least one other serving cell already activated for the wireless device in the same frequency band as that in which the serving cell is to be activated, the selection including selecting an activation procedure in which the wireless device refrains from conducting a receive beam sweep to determine a receive beam on which to receive from the serving cell to be activated.

* * * * *